United States Patent
Sitton

(10) Patent No.: US 9,826,829 B2
(45) Date of Patent: Nov. 28, 2017

(54) PRINTABLE BENDABLE SHEETS, CONSTRUCTIONS COMPRISING THEM AND METHODS OF MAKING SAME

(71) Applicant: Oren Sitton, Ness-Ziona (IL)

(72) Inventor: Oren Sitton, Ness-Ziona (IL)

( * ) Notice: Subject to any disclaimer, the term of this patent is extended or adjusted under 35 U.S.C. 154(b) by 0 days.

(21) Appl. No.: 15/115,666

(22) PCT Filed: Apr. 2, 2015

(86) PCT No.: PCT/IL2015/050371
§ 371 (c)(1),
(2) Date: Jul. 30, 2016

(87) PCT Pub. No.: WO2015/151111
PCT Pub. Date: Oct. 8, 2015

(65) Prior Publication Data
US 2017/0071334 A1   Mar. 16, 2017

(30) Foreign Application Priority Data

Apr. 3, 2014   (IL) .......................................... 231941

(51) Int. Cl.
*A47B 47/00* (2006.01)
*A47B 47/04* (2006.01)
(Continued)

(52) U.S. Cl.
CPC ........ *A47B 47/047* (2013.01); *A47B 47/0041* (2013.01); *A47B 47/042* (2013.01);
(Continued)

(58) Field of Classification Search
CPC ....... A47B 47/047; A47B 57/44; A47B 61/00; A47B 96/066; A47B 47/042;
(Continued)

(56) References Cited

U.S. PATENT DOCUMENTS

| 3,722,971 A | 3/1973 | Zeischegg |
| 3,751,127 A | 8/1973 | Black, Jr. et al. |

(Continued)

FOREIGN PATENT DOCUMENTS

| JP | 2012011729 | 1/2012 |
| WO | 0150915 A1 | 7/2001 |
| WO | 2010029154 A2 | 3/2010 |

OTHER PUBLICATIONS

IL Search Report dated Aug. 12, 2014 5 Pages.
(Continued)

*Primary Examiner* — Daniel J Troy
*Assistant Examiner* — Hiwot Tefera
(74) *Attorney, Agent, or Firm* — The Roy Gross Law Firm, LLC; Roy Gross

(57) ABSTRACT

Modular constructions made of easily assembled and disassembled light-weight materials, where the structural parts of these constructions are made of multiwall sheets that enclose a supporting structure. The supporting structure may be a plurality of bubbles, corrugated or fluted structure that respond anisotropically to pressure applied towards a bendable surface of the two surfaces along a desired line of bending. The second surface opposite the bendable surface is textured allowing printing graphics on it that is not stretched or harmed in the bending area, thereby enabling continuous flow of graphics along the entire printing area. The line of bending may be formed thermally, mechanically or in a combination of thermal and mechanic operations. The sheets are folded upon themselves to form three-dimensional structures. These structures combine together to form modular constructions such as shelf systems, cabinets, closets, vanities and cupboards.

20 Claims, 29 Drawing Sheets

(51) Int. Cl.
  *A47B 87/00* (2006.01)
  *A47B 57/44* (2006.01)
  *A47B 61/00* (2006.01)
  *A47B 96/06* (2006.01)

(52) U.S. Cl.
  CPC .............. *A47B 57/44* (2013.01); *A47B 61/00* (2013.01); *A47B 87/008* (2013.01); *A47B 96/066* (2013.01); *A47B 2230/07* (2013.01)

(58) Field of Classification Search
  CPC .............. A47B 47/0041; A47B 87/008; A47B 2230/07; B29C 53/04
  USPC ....... 312/263, 257.1, 265.2–265.5, 140, 107, 312/108, 111; 428/195.1; 264/132, 295, 264/339
  See application file for complete search history.

(56) References Cited

U.S. PATENT DOCUMENTS

| | | | |
|---|---|---|---|
| 3,874,753 A | 4/1975 | Naito et al. | |
| 3,879,096 A | 4/1975 | Blodee | |
| 4,125,338 A * | 11/1978 | Lew | A47B 47/0041 312/263 |
| 4,319,795 A | 3/1982 | Klaus | |
| 4,378,137 A | 3/1983 | Gibson et al. | |
| 4,585,129 A | 4/1986 | Lundqvist | |
| 4,926,759 A | 5/1990 | Vitsky et al. | |
| 4,966,424 A | 10/1990 | Schneider | |
| 5,188,246 A * | 2/1993 | Maxworthy | A47F 5/0846 108/152 |
| 5,451,102 A * | 9/1995 | Chuan | F16B 12/14 312/257.1 |
| 5,488,914 A | 2/1996 | Ouellette | |
| 5,588,541 A | 12/1996 | Goetz | |
| 5,678,706 A | 10/1997 | Husak et al. | |
| 5,695,263 A | 12/1997 | Simon | |
| 5,813,738 A * | 9/1998 | Cheng | F16B 12/14 312/257.1 |
| 6,352,024 B1 * | 3/2002 | Childress | B41D 7/00 101/111 |
| 6,371,035 B1 * | 4/2002 | Schiedegger | A47B 47/00 108/180 |
| 7,021,019 B2 * | 4/2006 | Knauseder | E04F 13/10 24/297 |
| 7,682,100 B2 * | 3/2010 | Duval | F16B 12/2027 312/111 |
| 7,998,549 B2 * | 8/2011 | Susnjara | A47B 47/042 29/428 |
| 8,641,315 B2 * | 2/2014 | Liu | A47B 95/00 403/297 |
| 9,060,602 B2 * | 6/2015 | Chen | A47B 47/0016 |
| 9,414,678 B2 * | 8/2016 | Bennie | A47B 47/0066 |
| 2003/0070381 A1 * | 4/2003 | Hawang | A47B 47/042 52/536 |
| 2004/0101357 A1 | 5/2004 | Dijkstra et al. | |
| 2006/0242802 A1 | 11/2006 | Scroggie | |
| 2007/0125735 A1 | 6/2007 | Choi | |
| 2007/0145865 A1 | 6/2007 | Richter | |
| 2009/0175678 A1 | 7/2009 | Nientiedt | |
| 2013/0098909 A1 * | 4/2013 | Sitton | A47F 5/118 220/4.28 |
| 2015/0305521 A1 * | 10/2015 | Volz | A47F 5/118 211/135 |

OTHER PUBLICATIONS

IL Search Report dated Jun. 5, 2013 6 Pages.
International Search Report PCT/IL2015/050371 Search Completed Aug. 19, 2015; dated Sep. 14, 2015 4 pages.
IL Search Report dated Jun. 5, 2013 5 Pages.
"Corex Launches New Armaboard." Corex May 3, 2013. http://www.corex.net.au/news/view/id:7/title:Corex+launches+new+Armaboard+(bubble+structure+sheet).

* cited by examiner

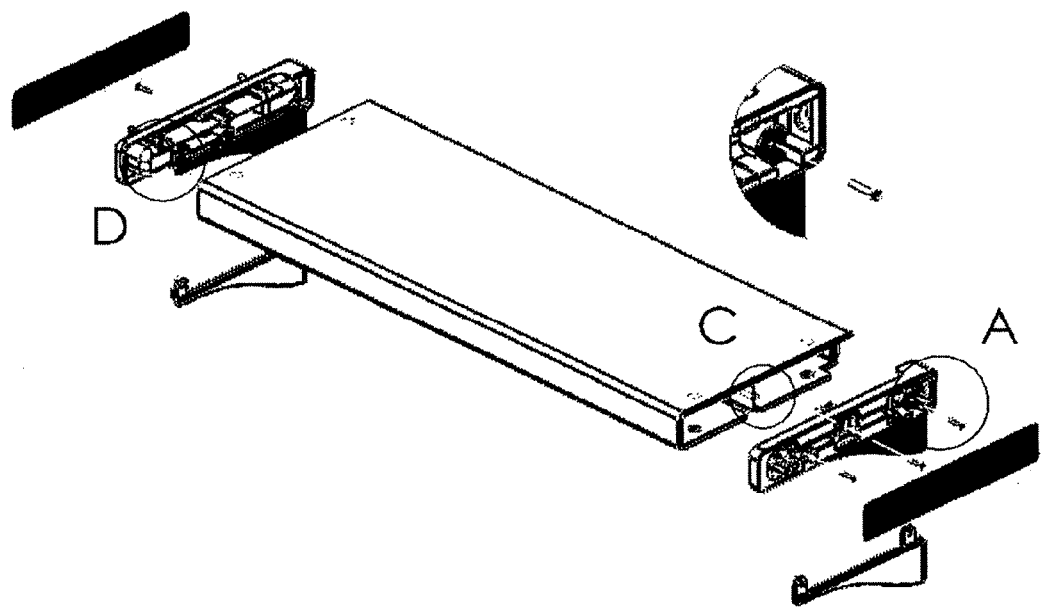
Fig. 14
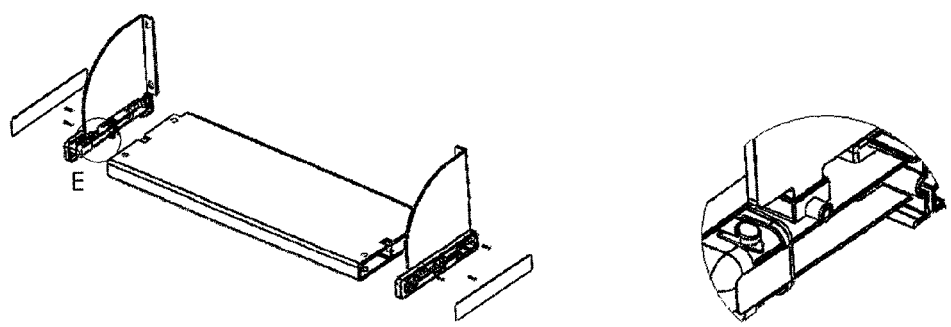
Fig. 15
Fig. 16

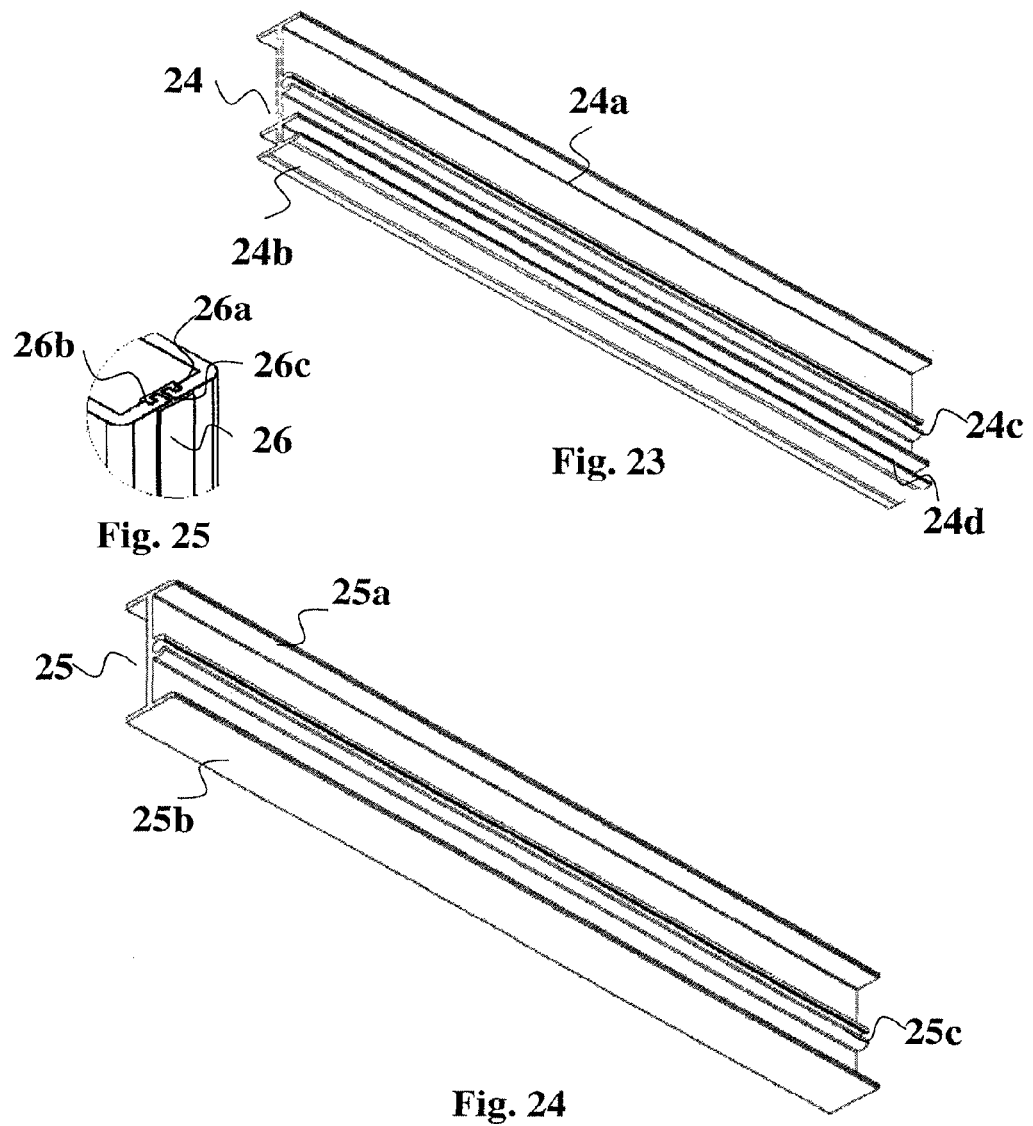

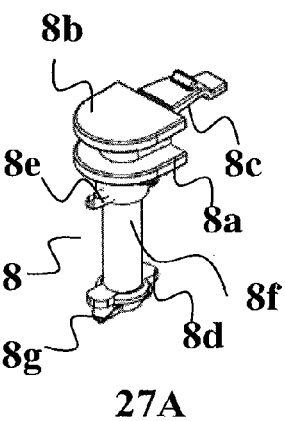
27A
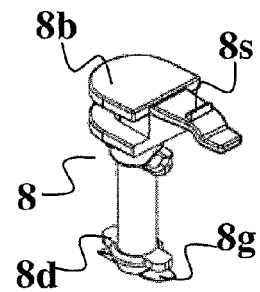
27B
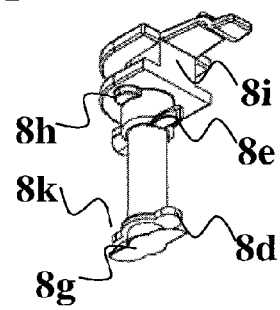
27I
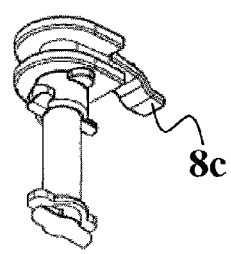
27C
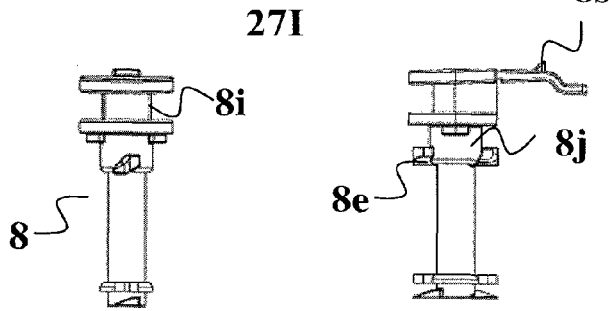
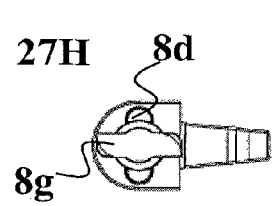
27H
27F
27G
Fig. 27
27D
27E

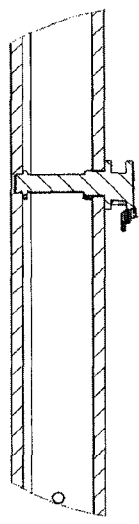 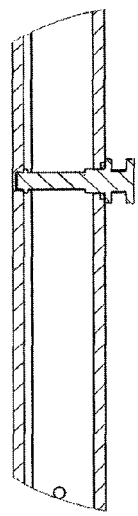 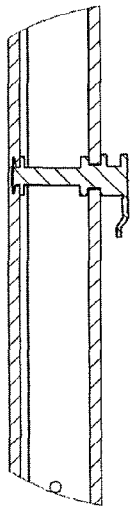
28A  28B  28C
Fig. 28
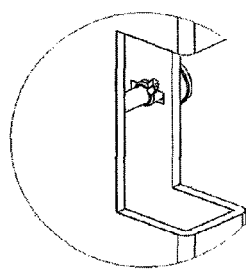 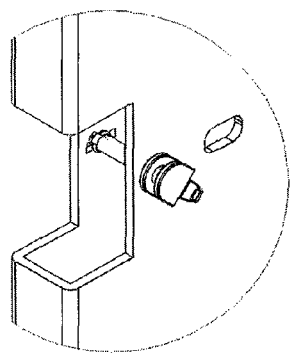
29A  29B
Fig. 29

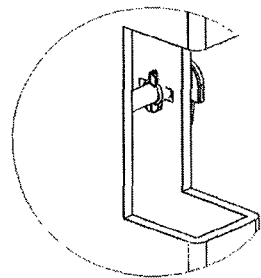
29C
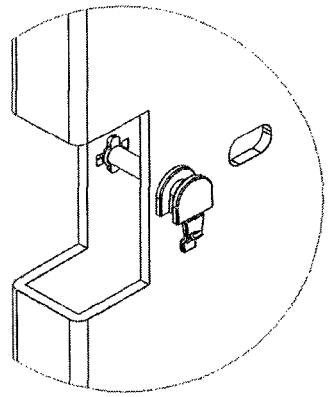
29D
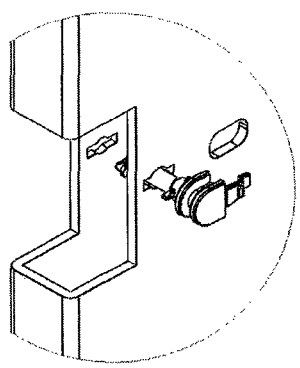
29F
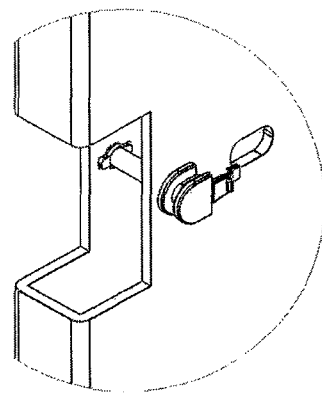
29E
**Fig. 29
continued**

30A
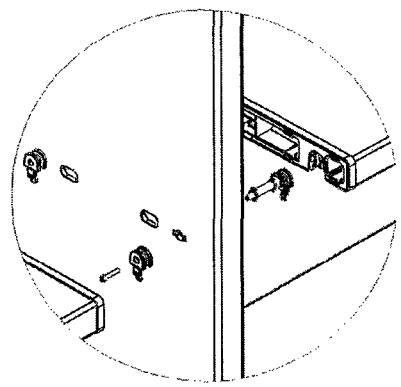
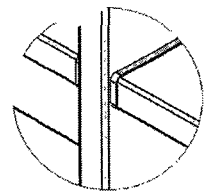 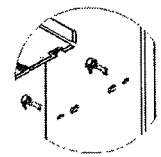
30B  30C
Fig. 30
31A 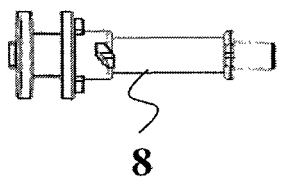 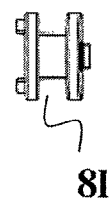 31B
8  8l
31D 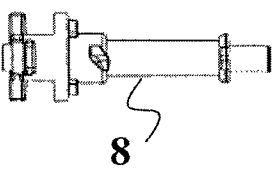 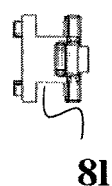 31C
8  8l
Fig. 31

39A  39B
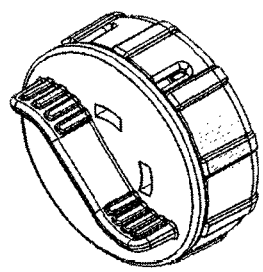
39C
Fig. 39

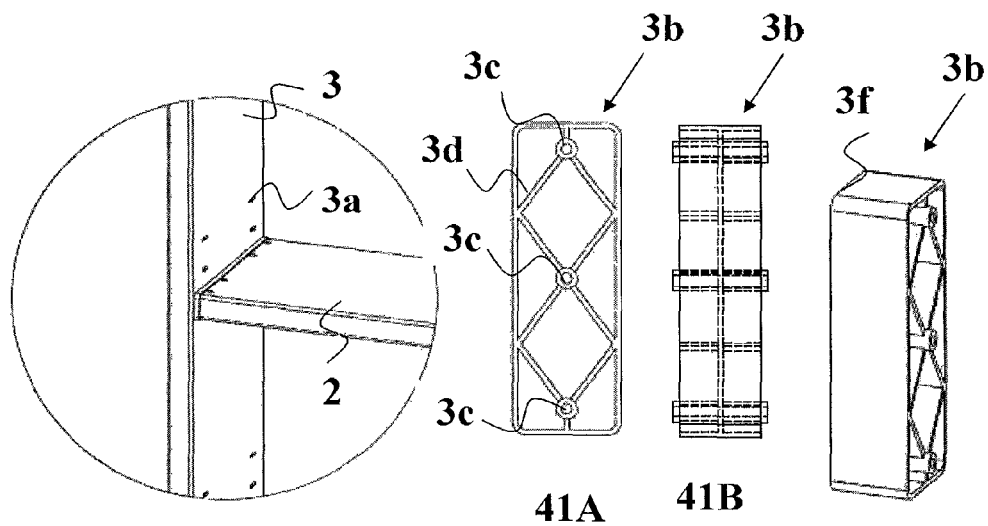
Fig. 40   41A   Fig. 41   41C
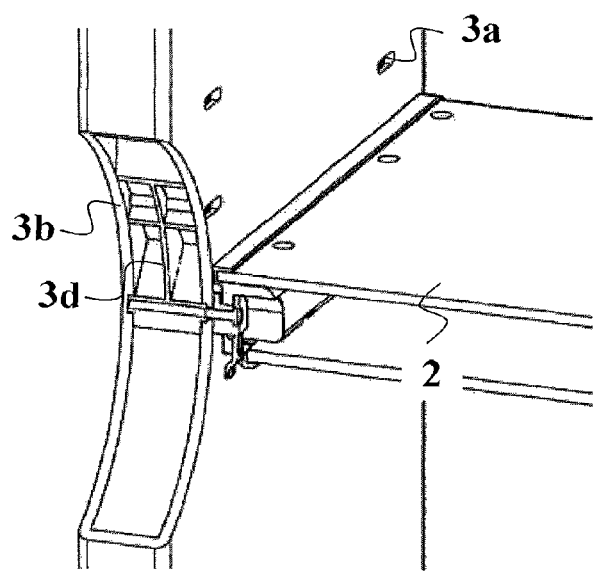
Fig. 42

PRINTABLE BENDABLE SHEETS, CONSTRUCTIONS COMPRISING THEM AND METHODS OF MAKING SAME

TECHNICAL FIELD

The present invention pertains to printable and bendable sheets made of polymeric materials. Further, the present invention pertains to constructions comprising bended printable polymeric sheets and methods of making such printable bended sheets and constructions.

BACKGROUND

Most of the currently available modular storage constructions such as furniture and casings are made of either wood, ply wood, cardboard, metal and rigid polymeric materials. The assembling of the parts of such modular constructions contains several shortcomings. First, certain kinds of them require the use of screws and nails to attach their parts to each other in order to form the construction. This does not render them user-friendly, in particular to persons who are not skilled technically or experienced in building such constructions. Additionally, the screws and nuts themselves impart a weakening effect due to their brutal insertion into the different parts of the constructions, in particular when disassembling a construction and reassembling the parts. Other kinds of constructions overcome these drawbacks by coupling protrusions and recesses structurally matching each other. These constructions, however, have a limited weight loading capacity because of the relatively weak locking of such couplings, uneven relay of weight load through them and uneven weight distribution all over the construction. Large weight of articles stored in constructions of all kinds tends to distribute unevenly on the different parts and eventually cause them to yield in unsupported areas of the constructions and joints. This is caused due to the lack of a sufficiently strong and balanced skeleton or any other load carrying and distributing elements in such constructions. To resolve this, the parts of these constructions can be made thicker, heavier and more rigid. In addition, more robust coupling elements can be used at the joints. This in turn eliminates the advantages of light-weight, easily assembled and disassembled user-friendly constructions. Otherwise storage furniture, for example, which is formed of light-weight materials and/or containing relatively small amount of material is provided as ready-made product. Such furniture is also susceptible to speedier wearing.

Another disadvantage of currently used materials for constructions is the lack of proper method for retaining graphics printed on flat sheets of such materials continuous and intact after bending them and at the bending regions. In fact, most types of print tend to crack when bending a sheet of any one of the materials mentioned above due to the elongation of their surface skin along the bending lines. This leaves blank spaces in the formerly continuous graphics, which severely impairs the aesthetic feature of the construction.

It is, therefore, an object of the present invention to provide modular, light-weight, user-friendly and reversibly assembled constructions that overcome the shortcomings of the currently produced modular constructions.

Yet another object of the present invention is to provide bended sheets made of light-weight materials for producing such constructions, where the bended sheets are designed as the three-dimensional (3D) parts of these constructions.

Yet another object of the present invention is to provide printable and bendable sheets and a method of printing and bending them, while retaining the print intact throughout the surface skin of the bended sheets.

Yet another object of the present invention is to provide modular printed constructions, where the print on all of the parts of the constructions forms a continuous intact graphic as desired.

This and other objects of the present invention will become apparent as the description proceeds.

SUMMARY OF THE INVENTION

The following details particular aspects and embodiments of the present invention.

Constructions

In one aspect, the present invention provides modular constructions made of easily assembled and disassembled light-weight materials, where the structural parts of these constructions are made of sheets folded upon themselves thus enclosing hollow spaces.

In one particular embodiment, sheets made of the light-weight materials comprise rigidity and a certain amount of flexibility, which makes them proper for folding into the structural hollow closed parts of the constructions and carrying relatively high weight loads. The bending of such rigid sheets provides the advantages of forming single-piece hollow parts of any closed shape, since the bending is not limited to a particular area of the sheets. The hollow closed shapes make the structural parts of the constructions light weight and therefore easily carried and handled. This also reduces costs of producing such constructions without significantly compromising on their load carrying capacity. In one particular embodiment, the sheets are double-side sheets enclosing a hollow space between them. The sheets are rigid and the hollow space between them may be populated with a structure supporting them. In particular, the supporting structure may be in the form of a plurality of spacers such as bubbles filling the hollow space, a honeycomb structure, a fluted or corrugated structure or the double-side sheets may be in the form of a multiwall structure. Particular examples of materials from which the sheets may be made of are polypropylene, bubble-polypropylene, foamed PVC (polyvinyl chloride), polycarbonate, polystyrene, polyester, polyethylene and combinations thereof for the sides of the sheets and the supporting structure in the hollow space between them.

In still another particular embodiment, the assembling of the constructions of the present invention is made by attaching the closed shapes to each other using built-in couplings of through-and-through screws and recesses. This requires only little work from a user that eventually sums up to connecting the parts to each other, for example, according to a particular design accompanying a kit that comprises the required parts of a construction. Such assembling process is user-friendly. Furthermore, the construction parts are three-dimensional, which makes them steadier and, therefore, more easily handled even by not technically experienced users.

In one particular embodiment, the sheets and structural parts made from them are of sufficient thickness to accommodate and strongly hold the body of the screws in their respective recesses in the parts. In addition, the sheets bulk has sufficient strength to lock the screws in place and create a continuous load distribution between interconnected parts. Thus, a balanced higher weight carrying construction is obtained despite the lack of solid material within the space enclosed by the structural parts.

In still another particular embodiment, the weight load capacity of the structural parts is enhanced by reinforcing components. In particular, reinforcing components are introduced into the seam lines in the structural parts and contact regions between parts, thereby imparting further weight carrying capacity and a more even load distribution to the constructions and also enhancing their structural stability.

Accordingly, the combination of hollow closed shapes of structural parts, rigid materials from which these parts are made and weight carrying and distributing connecting components overcomes the lack of sufficient solid material, and forms stable and strong constructions.

In one embodiment, the present invention provides a modular reversibly assembled construction configured for carrying high weight loads and accommodating and storing articles, said construction comprising a plurality of structural parts enclosing hollow space made of flat sheets folded around themselves, said structural parts are reversibly attached to each other with screw-connector couplings, said connector is configured to mate with open edges of said structural parts, said screw is configured to lock within said connector and extend through hollow space enclosed within said structural part and lock within parallel walls of said hollow parts.

The construction may further comprise a top cover configured to mate with connector-connector couplings, said connector-connector coupling is configured to mate with open edges of said top cover and open top edges of neighbor structural parts.

The connector-connector couplings may be triple-part couplings comprising two side parts configured to mate with open edges of said top cover or said neighbor structural part and middle part configured to mate with said side parts, said side parts, middle part, edges of top cover and edges of neighbor structural parts are inclined 45°, wherein a direction of each inclination thereof is configured to mate with opposite direction of neighbor inclination.

The construction may further comprise corks configured to close open edges of said structural parts.

In another particular embodiment, the construction further comprises covers overlaid on open sides of structural parts, particularly vertical parts, and dedicated screws configured to attach these covers to the open sides of the structural parts. Alternatively, the open sides are left exposed.

In another particular embodiment, the open edges of vertical sides, e.g. vertical beams, formed from folding the sheet to a 3D structure, are connected to each other with H-shape aluminum profile, plastic screws or ultrasonic welding.

The connector may further comprise middle and edge recesses configured to mate with patterned margins of said open edges of said structural parts, said edge recesses comprising a tab configured to press against and lock said screw within said edge recesses.

In one particular embodiment, the present invention provides a single-head screw comprising a top section, a middle section and a lower section, said top section comprising top and bottom flat surfaces parallel each other and a vertical spacer between said surfaces and a step-shaped tab extending away from said top flat surface, said middle section comprising an upper section and lower elongated body, said upper section comprising flaps extending out in opposite directions relative each other, said lower elongated body is of sufficient length to extend through hollow space within said structural part and between inner surfaces of said structural part, said upper section is of thickness greater than thickness of said lower elongated body, said lower section comprising two pairs of flaps oriented in parallel to each other, each flap extending away from said lower part in direction opposite a direction of the second flap in each one of said pairs.

In still another embodiment, the present invention provides a modular double-head screw comprising a top section, a middle section and a lower section, said top section comprising top and bottom flat surfaces parallel each other and a vertical spacer between said surfaces and a step-shaped tab extending away from said top flat surface, said middle section comprising an upper section and lower elongated body, said upper section comprising flaps extending out in opposite directions relative each other, said lower elongated body is of sufficient length to extend through hollow space within said structural part and between inner surfaces of said structural part, said upper section is of thickness greater than thickness of said lower elongated body, said lower section comprising a pair of flaps extending away form said lower section in opposite directions relative each other and hollow cylindrical part extending from said flaps away and along the axis of said lower elongated body and a bottom head identical to said top head, said bottom head further comprising a cylindrical hollow space configured to accommodate said cylindrical part of said lower section.

The construction of the present invention may be any type of shelf system or furniture such as closet, cabinet, vanity, cupboard and dresser used to store and accommodate articles.

In one particular embodiment, the shelf system comprises a single set of shelves positioned parallel to and above each other and horizontally relative to and connected to two vertical beams at their open edges, said shelves and vertical beams are said structural parts, said screw is a single-head screw, each of said two vertical beams comprising through-and-through holes at their proximal walls relative to said shelves and non-through grooves distanced horizontally from said through-and-through holes and non-through hole at distal walls of said vertical beams parallel said through-and-through holes, said through-and-through holes are configured to allow insertion of elongated body of said single-head screw, said non-through grooves are configured to lock a step-shaped tab extending from said top section of said single-head screw, said step-shaped tab comprising a tooth extending vertically away from said tab, said elongated body is of length equal the distance between inner surfaces of said proximal and distal walls of said vertical beams, said single-head screw comprising flaps at an upper part of middle section thereof, said flaps are configured to press against said inner surface of said proximal wall of said vertical beams, and two pairs of flaps at lower section of said single-head screw configured to press against the outer and inner sides of said inner surface of said distal walls of said vertical beams.

In still another embodiment, the shelf system comprises at least two sets of shelves each set of shelves comprising a plurality of shelves positioned in parallel to and above each other and horizontally relative to vertical beams, said sets of shelves are positioned at equal levels relative each other, each two shelves at equal level, one from each set, are connected to vertical beam between them with a double-head screw-connector couplings, said vertical beam comprising through-and-through holes at its proximal and distal walls relative said shelves and through-and-through holes at proximal walls and non-through grooves at distal walls of vertical beams parallel said through-and-through holes at each side of said vertical beam distanced horizontally from each other, said through-and-through holes are configured to allow the insertion of elongated body of said double-head screw, said non-through grooves are configured to lock a step-shaped tab extending from said top sections of said heads of said double-head screw, said step-shaped tab comprising a tooth extending vertically away from said tab, said elongated body is of length equal the distance between inner surfaces of said proximal and distal walls of said vertical beam, said double-head screw comprising flaps at an upper part of middle section thereof, said flaps are configured to press against said inner surface of said proximal wall of said vertical beams, a pair of flaps at lower section of said double-head screw extending away form said lower section in opposite directions relative each other and hollow cylindrical part extending from said flaps away and along the axis of said lower elongated body, bottom head and top head of said double-head screw are identical to each other, said bottom head further comprising a cylindrical hollow space configured to accommodate said cylindrical part of said lower section, said top head and bottom head are configured to support two equally leveled shelves from two sides of said vertical beam between them.

In still another embodiment, the construction is a floating shelf comprising a single structural part from a sheet folded upon itself, two corks configured each to mate with an open edge of said shelf, two supports configured to slide into rail grooves in said corks, screws configured to lock said supports to said corks and outer covers configured to close exposed sides of said corks.

In still another embodiment, the construction is a hanging shelf comprising a single structural part from a sheet folded upon itself, two corks configured each to mate with an open edge of said shelf, two hangers configured to slide into rail grooves in said corks, screws configured to lock said supports to said corks and outer covers configured to close exposed sides of said corks.

The construction may further comprise a back support attached to distal sides of said vertical beams. Particularly, the back support is selected from a solid board that covers at least part, preferably the entire back side of a construction between the vertical beams. The back support may also be X-shape positioned metal, e.g., aluminum, rails or X-shape positioned strings, said aluminum rails and strings are configured to connect with top and bottom ends of said vertical beam.

In particular, the X-shape strings further comprise a box mating with intersection of said strings, the box comprises case and cork, said cork is configured to mate with said case and lock within, said box is configured to turn around its axis and stretch said strings to a desirable tension.

In another particular embodiment, the construction further comprises at least one connecting means that is configured to connect the construction to a wall. Such connecting means may be in the form of a right angle connected to outer surface of vertical beams of a shelf system at one rib and to the wall at a second rib. Such right angle provides additional reinforcement and stability to the shelf system. The connecting means may be made of rigid synthetic or metallic materials.

A further reinforcing metal, particularly aluminum, rail or profile may be added to a structural part of neighbor structural parts in a construction, which is configured to close on adjacent edges of said construction part, said adjacent edges are not attached to each other. The use of the metal (e.g. aluminum) rail/profile may be for reinforcing horizontal structural parts such as shelves. The rail/profile also stabilizes the horizontal parts, e.g. shelves, by relaying load on them to vertical structural parts connected to the shelves such as beams connected to the shelves with appropriate connectors.

The aluminum profile/rail comprises outer flat surfaces configured to press against sides of a surface of said structural part or connect between adjacent structural parts and a channel positioned between said flat surfaces and configured to accommodate anedge of the surface. Beside reinforcing and stabilizing structural parts, the profile/rail is also configured to lock the corks or connectors that enclose a structural part, such as a horizontal shelf, on its opposite edges. The profile/rail contains and encloses such shelf, which is a folded sheet, by locking its bottom edges to each other along the entire length of the shelf and also holding the edges from the opposite sides of the shelf.

In another embodiment, the aluminum rail comprises outer flat surfaces configured to press against adjacent structural parts and edges extending from ends of one of said outer flat surfaces and configured to mate with non-through channels within walls of said neighbor structural parts.

In one aspect of the present invention, the flat sheets comprise printable surface, bendable surface opposite said printable surface and spacers between said printable surface and bendable surface, said spacers are oriented in space comprising a top end interfacing said printable surface and bottom end interfacing said bendable surface, said top end of said spacers comprising a thicker layer of material relative to said bottom end of said spacers. The printable surface is an outer surface of said structural parts and said bendable surface is an inner surface of said structural parts.

The printable surface is textured to enable a layer of paint to adhere to it.

In one embodiment, the flat sheet is polypropylene bubble sheet comprises textured printable surface and bendable surface opposite the textured printable surface, both of the surfaces are rigid, where the spacers are polypropylene bubbles oriented towards the textured printable surface, where top end of said bubbles comprises a thinner layer of polypropylene relative to lower end of the bubbles.

In still another embodiment, the flat sheet is extruded polypropylene fluted multiwall, or the supporting structure in the space between the sides of a double-side flat sheet is an inner honeycomb structure or a fluted or corrugated structure. Particular examples of materials from which the sheets may be made of are polypropylene, bubble-polypropylene, foamed PVC (polyvinyl chloride), polycarbonate, polystyrene, polyester, polyethylene and combinations thereof for the sides of the sheets and the supporting structure in the hollow space between them.

Printing

In one aspect, the present invention provides a method for printing on the sheets and bending them to a desired shape while maintaining the print continuous and intact at the bending areas. This way, a three-dimensional shape is produced with a customizable continuous print surface. Namely, the method of printing and bending enables to design a continuous flow of the print throughout all of the structural parts of any construction. This might be achievable with special stretchable types of paint, but these are not required in the method of the present invention in order to achieve the continuous flow of the print in the construction.

It should be noted that the present invention is not limited in any way to any method of printing on the sheets. This is because the forming of a 3D shape retains the print or graphics printed on the sheet regardless of the method of producing them. Accordingly, various printing methods may be applied in forming 3D shapes and structures. Some non-limiting examples of printing methods are UV digital print, Digital print and Silk screen printing. It should also be noted that manual painting or dyeing of the sheets is also contemplated on within the scope of the present invention in producing a customized pre-designed graphics according to the decision of a user.

In view of the above, in one particular embodiment, the present invention provides a construction with printable surfaces of its structural parts, where these surfaces enable designing a customizable continuous flow of print or graphics throughout the entire surfaces of the construction. Accordingly, the present invention also provides a kit that comprises all of the structural parts of a construction with customizable pre-designed print or graphics that forms a coherent image all over the construction surface. The continuous flow of print or graphics is achievable with different types of sheets and materials. In particular, sheets made of polymeric materials that possess both rigidity and a certain level of elasticity may respond to applied stress anisotropically and retain an intact print or graphics on their outer surface upon bending. Particular polymeric materials contemplated on in the present invention may be selected from polycarbonate polymers, styrene polymers, aliphatic polymers, ester polymers, fluoroethylene polymers, vinyl polymers and vinyl acetate polymers and combinations thereof. Particular polymers contemplated on within the scope of the present invention are polycarbonate, polystyrene, polyethylene, polypropylene, polyester, polyvinyl acetate and polytrifluoroethylene and combinations thereof.

Ideally, double-side flat sheets are used to make the structural part of a construction of the present invention. These double-side flat sheets allow heat-bending them at their bendable side without harming the print or graphics overlaid on the outer surface of the printable side of the flat sheet. Such double-side sheets also enable their mechanical bending at their bendable side after subtracting material from the bendable side of the sheet along a desired strip and to a certain depth. The subtraction of the material ensures that a layer at the outer surface of the printable side remains unharmed.

Further, flat sheets made of such polymeric materials may be designed to respond anisotropically to stress applied on one of the two surfaces of a sheet. For example, a multiwall configuration of a sheet may be designed to relay applied stress on the printable surface of the sheet towards the inner volume of the multiwall and the bendable surface opposite the printable surface. The inner space of the multiwall sheet may be spatially oriented, for example by containing anisotropic spacers with thicker supporting surfaces interfacing the bendable surface of the sheet and thinner surfaces interfacing the printable surface of the sheet. Particular example of such anisotropic spacers is bubbles of the polymeric material used, which are inflated within the space between the two surfaces of the sheet. Alternatively, these spacers may be configured with a thickness gradient reducing from the thickest layer interfacing the bendable surface of the sheet towards the thinnest layer interfacing the printable surface of the sheet. Such configuration of the spacers relays the bending stress applied on the printable surface of the sheet inwards through the spacers to the bendable surface. This keeps the outer skin of the printable surface intact, namely the surface density of the printable surface is kept unchanged in the bending process. Therefore, the paint of any print overlaid on the printable surface of the sheet is kept from stretching in the bending process and remains coherent and continuous throughout the bended area of the sheet as well.

In one particular non-limiting embodiment, the present invention employs double surface anisotropic multiwall structure of bubble polypropylene flat sheets, which are printable in one of their outer surfaces, bendable in their second surface opposite the printable surface and retain any print or graphics printed on the printable surface intact upon bending. The space between the two surfaces is populated with polypropylene bubbles with oriented configuration or fluted/corrugated-extruded structure, where their base interfaces with the inner side of the bendable surface and their top interfaces with the inner side of the printable surface. The orientated configuration of the bubbles originates from directionally blowing them up from the inner side of the bendable surface towards the inner side of the printable surface of the multiwall sheet. This way the top end of each bubble contains a smaller amount of polypropylene material than its bottom end and is, therefore, thinner and less resistant to yielding than the bubble bottom end. Accordingly the bottom ends of the bubbles provide rigid support to the printable surface of the multiwall sheet the bubbles relaying the stress applied on the sheet along their surfaces towards the bendable surface. Upon applying stress on the printable surface towards the bendable surface of the sheet, the bubbles at the bending area collapse into their bases, relaying the stress applied along their thinner surfaces. This way their thicker surface at their bottoms absorbs at least the majority of the stress. The bubbles are attached to and interface with the two sides of the flat sheet separately from each other. Further, the spacing between these bubbles is sufficient to allow uniform bending of the sheet. The outer skin of the printable surface retains its original surface density due to the resistance of the bubbles bottom ends to the applied stress and relay of strain. Namely, the outer skin of the printable surface is kept from stretching, thus keeping any paint overlaid on it intact and continuous at the bending areas. This way a continuous flow of the print on the outer surface of a 3D shape is made possible, particularly leaving no voids or cracks in the print or graphics in the bending areas.

In summary, the flat sheets used in the present invention comprise the beneficial characteristics of yielding gradient along their thickness, relayed response to stress as a result and printable surfaces. The combination of these features imparts the sheets the advantages of forming 3D articles from them while maintaining the sheets surface density. This in turn provides the sheets with the advantage of retaining any print or graphics overlaid on their surfaces intact due to the fact that the outer skin of their surfaces is not stretched or torn upon bending, thereby keeping the paint layer continuous even at the bending areas. It should be noted that the bubble configuration is not exclusive. Corrugated, fluted and any other multiwall formations are also contemplated within the scope of the present invention. Therefore, the flat sheets may comprise supporting formation between their rigid sides, where such supporting formation may be in corrugated, fluted or any other multiwall form.

In view of the above, the present invention pertains to methods of preparing 3D articles that contain at least one bended area from flat sheets of polymeric materials. The bending process in these methods may apply only mechanical force for shaping a 3D article or a combined application of mechanical force and thermal heating to achieve the desired yielding response of the sheet. Preferably, the methods of shaping 3D articles of the present invention retain the original surface density of the outer skin side of one of the surfaces of the sheet in the articles. This way, the advantage of continuous print or graphics all over the outer surface of a 3D article is made possible, enabling pre-designing a continuous flow of print on an entire set of 3D articles that combine together to form a construction.

Printing and Shaping Methods

The printable surface of a sheet used in the present invention is preferably textured, which provides improved adherence of paint compositions to the surface. It should be noted that a textured surface suitable for printing is not limited to the type of material the sheet is made of or the sheet structure. Textured surface or any type of surface physically and mechanically suitable for retaining paint layer on it is contemplated within the scope of the present invention. Particularly, compositions of materials that provide such textured surfaces or methods that enhance the roughness of at least the printable surface of the sheets may be used in the present invention in order to obtain improved adherence of paint to the sheet surface.

Flat sheets of the present invention comprising the beneficial characteristics of yield gradient along their thickness, relayed response to stress and printable surfaces may be used to form 3D articles. The following details particular non-limiting examples of methods for printing and bending flats sheets to such 3D articles.

Thermal Bending

A particular non-limiting example of a method of shaping 3D printed article with at least one bended area from flat polymeric sheets comprises:
applying primer paint to a printable surface of a multiwall configuration sheet;
printing graphics on the printable surface of the multiwall configuration sheet; optionally applying sealer on the graphics;
cutting the sheet to desirable width and length;
heating a selected bending area at the bendable surface of the sheet; and
bending the sheet along the heated area towards the bendable surface of the sheet.

In one particular embodiment, the selected bending area is an end-to-end strip formed due to the heating of the bendable surface and running along the length or width of the sheet.

Mechanical Bending

In still another particular non-limiting example, a method of printing and shaping 3D article with at least one bended area from flat polymeric sheets comprises:
applying primer paint to a printable surface of a multiwall configuration sheet;
printing graphics on the printable surface of the multiwall configuration sheet;
optionally applying sealer on the graphics;
cutting the sheet to desirable width and length;
removing material off of a selected bending area at the bendable surface of the sheet at desired depth, width and length; and
bending the sheet in the selected bending area towards the bendable surface of the sheet.

Combined Thermal and Mechanical Bending

In still another particular non-limiting example, a method of printing and shaping 3D article with at least one bended area from flat polymeric sheets comprises:
applying primer paint to a printable surface of a multiwall configuration sheet;
printing graphics on the printable surface of the multiwall configuration sheet;
optionally applying sealer on the graphics;
cutting the sheet to desirable width and length;
removing material off of a selected bending area at the bendable surface of the sheet at desired depth, width and length; and
bending the sheet along the heated region towards the bendable surface of the sheet.

In one particular embodiment, the selected bending area formed in the mechanical methods in Examples 2 and 3 is an end-to-end channel running along the length or width of the sheet and the depth of the channel is 3.5 millimeters.

Forming 3D Articles

In still another particular embodiment, a 3D structural element enclosing a hollow space is manufactured by bending a flat sheet in more than one bending area on the sheet in anyone of the methods detailed above. The following details particular non-limiting Examples of forming furniture articles according to the methods detailed above. It should be noted that the following Examples and equipment mentioned therein are not exclusive and that any other equivalent ways and equipment of printing, specification thereof and methods of forming the 3D articles of the present invention are contemplated on within the scope of the present invention.

Example 1—Shelf and Shelf System

A 5 millimeters double-sided flat multiwall polypropylene bubble sheet manufactured in Italy by IMABALLAGGI PROTETTIVI with interior space populated with polypropylene dome-shape bubbles arranged in a similar to honeycomb formation between two flat rigid panels is used for preparing a beam structure. The sheet has asymmetric configuration, where the top ends of the domes interface one board and the bases of the domes interface the opposite board of the sheet. The structural orientation of the dome bubbles enables relaying stress applied to the board interfacing their top along their surface towards their thicker bases. The thinner tops of the domes collapse towards the bases and the domes bases then experience most of the strain. The board interfacing the domes tops is the printable board, which surface is textured to bond paint layer applied to it.

The textured board is then printed on with a FUJI INCA/GANDY/DOMINATOR/HP or any other printing machine. In particular, a FLAT BED printing machine having 40 ink heads with four colors and one white color is used. The printed sheet is then cut with tangential blade in a 3-axis cutting machine of type ESKO to the desired length and width and peripheral pattern. A thermal dedicated bending machine comprising filaments and temperature controller is used to heat a bending line along the length of the sheet at the bendable board opposite the textured printed board. The filaments are heated to 200-400° C. and passed along a marked line on the bendable board. Upon achieving the desired heating level, the bendable board is melted at bending line and becomes sufficiently flexible to bend the sheet towards the bendable board. The sheet is placed in a fixture pattern (jig) with a desired width, e.g. 40 millimeters, for bending along the bending line and held there for a few minutes. After the desired bended shape is set the sheet is taken out of the jig and the process of heating and bending the sheet along another bending line on the bendable board is repeated. Alternatively, the bending along all lines may be done simultaneously by heating several lines at the same time. The sheet is then placed again in the jig for bending and permanently setting the bended shape. This is repeated until a 3D double open side shelf with two open edges enclosing a hollow space is obtained.

The rims of the two open sides of the shelf are cut with the cutting machine to a particular design that is mated with corresponding plastic injection connectors inserted into the open sides. The connectors include margins locking on the outer edge surface of the box, thereby fixing to the shelf and providing it with additional reinforcement and stability. The connectors also have built-in tooth locks into a non-through hole in the inner surface of the shelf. H-shape Aluminum profile is slid along the open edges of the shelf locking them to each other, thus providing additional reinforcement and stability to the shelf. The H-shape Aluminum profile also locks the connectors that mate with the shelf at the shelf sides. The connectors also have recesses designed to reversibly lock to connecting elements such as screws heads and attach the shelf to other 3D enclosed shapes of the same or different dimensions and shape at its open sides. The shelves prepared according to the process detailed above are attached to vertical beams with screw-recess couplings, thereby forming a shelf system, closet, cabinet, vanity, cupboard, dresser or any other type of furniture intended or designed to accommodate, store or display different objects.

Example 2—Beam

A 5 millimeters double-sided flat multiwall polypropylene bubble sheet manufactured in Italy by IMABALLAGGI PROTETTIVI with interior space populated with polypropylene dome-shape bubbles arranged in honeycomb formation between two flat rigid panels is used for preparing a beam structure. The sheet has the same characteristics of the sheet used for preparing the box in Example 1. The textured board of the sheet is then printed on with a FUJI INCA/ DOMINATOR FLAT BED printing machine having 40 ink heads with four colors and one white color. The printed sheet is then cut with tangential blade in a 3-axis cutting machine of type ESKO to the desired length and width and peripheral pattern. A line for bending the sheet is marked on the bendable board of the sheet and a channel is gnawed along the bending line by removing material off of the sheet to a depth of 3.5 millimeters with a cutting and gnawing machine. Alternatively, the gnawing of channels along several bending lines may be done simultaneously, thereby forming the bending lines at the same time. Non-through holes are also cut and gnawed at the bendable board at desired places with the same gnawing and cutting machine. Forming channels along bending lines parallel the first bending line is repeated, and the sheet is then bended along these channels to obtain a 3D closed beam that encloses a hollow space within. The beam has two open sides with patterned edges designed to mate with matching plastic injection corks, the corks locking to the interior surface of the beam with a built-in tooth and non-through hole couplings, the tooth of the cork locking in the hole in the beam. An upper closing cork is mated with the cork locked to the beam using tooth-recess couplings. The open edges of the beam are bonded to each other with plastic screws or they are welded together by point melting them with an ultrasonic machine. Otherwise, the open edges of the beam may remain exposed.

The beam is used in vertical configuration to support horizontally fixed shelves. Dedicated through-and-through holes are made on the width of one side of the beam to allow the insertion and fixture of dedicated screws that lock to the recesses in the connectors of each shelf. Non-through holes are cut in the exterior surface next to the through-and-through holes in the beam. The non-through holes lock the screws in particular position with a tooth extending from each head of the screw and accommodated in the non-through hole. Non-through holes are cut in the inner side of the second wall of the beam parallel to the through-and-through holes in the parallel wall. Couple propeller shaped flaps parallel to and distanced from each other at the distal end of the screw are pushed into the non-through hole. Upon turning the screw 90° sideways the extended tooth at its head locks to the non-through hole at the frontal wall and the most distal of the two flaps locks against the interior surface of the second wall of the beam.

Horizontal shelves may be attached to two supporting beams at their sides, thus forming any desirable shelf system, closet, cabinet, cupboard, vanity and any other furniture as desired.

Example 3—Upper Shelf

A 5 millimeters double-sided flat multiwall polypropylene bubble sheet manufactured in Italy by IMABALLAGGI PROTETTIVI with interior space populated with polypropylene dome-shape bubbles arranged in honeycomb formation between two flat rigid panels is used for preparing a beam structure. The sheet has the same characteristics of the sheet used for preparing the box in Example 1. The textured board of the sheet is then printed on with a FUJI INCA/ GANDY DOMINATOR/HP printing machine, particularly FLAT BED printing machine having 40 ink heads with four colors and one white color. The printed sheet is then cut with tangential blade in a 3-axis cutting machine of type ESKO to the desired length and width and peripheral pattern. The sheet is bended along bending lines formed in the thermal process as described in Example 1. H-shaped aluminum profile is slid through the open edges of the shelf formed and connects them to each other. The H-shape Aluminum profile also locks the connectors that mate with the shelf at the shelf sides. For a vertical beam, 45° angled corks at their exterior sides are mated with patterned edges at the upper side of the beam. The angled exterior sides of the corks are then mated with double-sided 45° angled mediating piece. The top ends of two vertical beams are cut at 45° and patterned to mate with a 45° angled cork. The two 45° angled corks of the shelf and beam are connected to the mediating double-sided 45° angled piece at both sides of the shelf. The corks and mediating piece are locked one to its neighbor with snaps and may be secured with a screw. They may be unlocked from each other by releasing the screw and the snaps. The releasing of the snaps may be carried out with a thin rod inserted into the corks or mediating piece that presses them down. The open edges of the beams are bonded to each other with plastic screws or they are welded together by point melting them with an ultrasonic machine. Otherwise, the open edges of the beam may remain exposed.

This form of assembling the top ends of the beams with the upper shelf of any shelf systems creates a stylish and aesthetic pattern. Additionally, horizontal shelves manufactured as described above, may also be connected to the beams between them.

Example 4—Floating Shelf

A 5 millimeters double-sided flat multiwall polypropylene bubble sheet manufactured in Italy by IMABALLAGGI PROTETTIVI with interior space populated with polypropylene dome-shape bubbles arranged in honeycomb formation between two flat rigid panels is used for preparing a floating shelf structure. The sheet has the same characteristics of the sheet used for preparing the box in Example 1. The textured board of the sheet is then printed on with a FUJI INCA/DOMINATOR FLAT BED printing machine having 40 ink heads with four colors and one white color. The printed sheet is then cut with tangential blade in a 3-axis cutting machine of type ESKO to the desired length and width and peripheral pattern. The sheet is bended along bending lines formed in the thermal process as described in Example 1. Injection molded corks are mated with patterned edges of the open sides of the shelf and attached with screws to H-shaped aluminum profile connects the open edges of the shelf to each other. The H-shape Aluminum profile also locks the connectors that mate with the shelf at the shelf sides. Plastic tabs extending from the corks lock to non-through holes cut in the interior surface of the shelf. 0.5 mm thick two plastic covering strips with width and length matching those of the side corks are provided to cover the corks. Double-sided adhesive tape is used to attach the coverings to the corks edges. Two right-angle triangle supports are provided that connect to the lower surface of the floating shelf with four screws and to a supporting wall with screws.

Alternatively, the same shelf is provided with hanging supports instead of the supporting triangles. The supports connect to the upper side of the shelf with screws. Both the floating and hanging shelf configurations enable printing graphics and shape-cut for decoration.

The following will describe particular and non-limiting examples of the present invention with reference to the drawings without departing from the scope and spirit of the present invention.

BRIEF DESCRIPTION OF THE DRAWINGS

FIGS. 14-17 illustrate a floating shelf at different perspective views and corks and supports connecting to it.
FIGS. 23-25 illustrate a reinforcing aluminum bar configured to mate with open edges of shelves and beams.
FIG. 27 illustrates perspective views of a shelf supporting screw designed for connecting a shelf to supporting means.
FIG. 28 illustrates cross section views of a shelf supporting screw in different positions.
FIG. 29 illustrates perspective 3D views of a shelf supporting screw in different positions.

FIG. 30 illustrates 3D double shelf system with double-sided shelf supporting screws.
FIG. 31 illustrates cross section views of double-sided shelf supporting screw.
FIG. 39 illustrates 3D perspective and cross section views of the disc for straining the back support strings.
FIG. 40 illustrates zoom-in view of the connection of a shelf to a beam.
FIGS. 41A-C illustrate different views of intermediating shelf-connector configured for connecting the shelf to the beam.
FIG. 42 is a zoom-in side-section view of a shelf-connector plugged between shelf and beam.

DETAILED DESCRIPTION OF THE DRAWINGS

Figure 1:
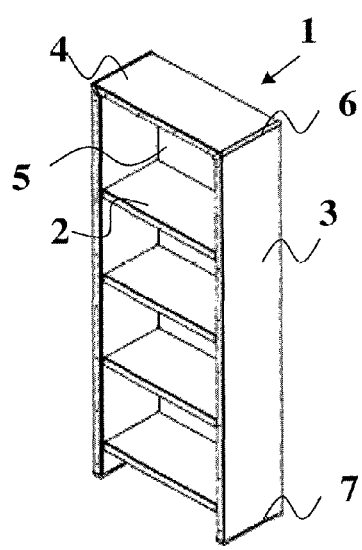
FIGS. 1-2 illustrate a general layout of a shelf system.
Figure 2:
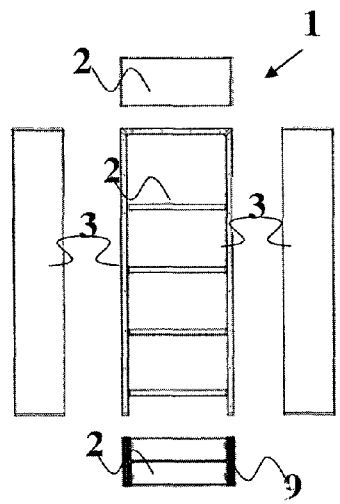

FIG. 1 illustrates a general construction of a shelf system (1) having two vertical beams (3) that support horizontal shelves (2) spaced apart from each other at selected distances along the length of the beams (3). The shelf system (1) also contains a cover shelf (4) closing it from above and attached to the beams (3) with mating corks (6). Bottom corks (7) mated to the lower ends of the beams (3) provide improved stability to the beams and protection from potential damaging, i.e. water, sharp objects etc. FIG. 2 is a cross section frontal view of the shelf system (1) in FIG. 1 and its parts. FIG. 2 also shows a cross section rear view of a shelf (2) having connector couplings (9) at both sides that connect to the beams (3).

It should be noted that the thickness of the beams (3), measured from the outer side of one wall to the outer side of the opposite wall, is only limited by their functionality. Namely, the beams (3) are of such thickness configured to stably share the load on the shelves (2), maintaining vertical rigid position. In one particular non-limiting embodiment, the thickness of the beams may vary between 4 cm and 1.5 cm. The same functionality applies to shelves (2) configured with a thickness sufficient to maintain their rigidity under a load, where such thickness ranges between 4 cm and 1.5 cm in one particular non-limiting embodiment.

The beams (3) may further be strengthened with T-shaped ribs extending within and along the length of the beams (3) and interfacing their sides.

Figure 3:
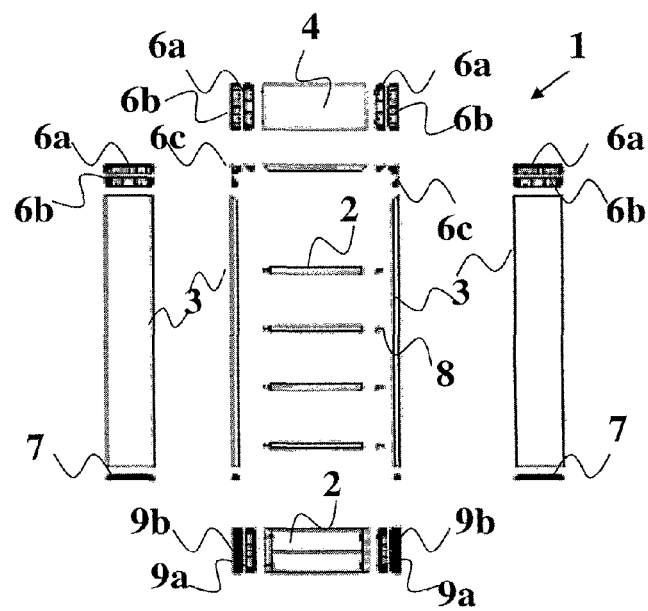
FIGS. 3-4 illustrate a shelf system layout with designated connecting means.
Figure 4:
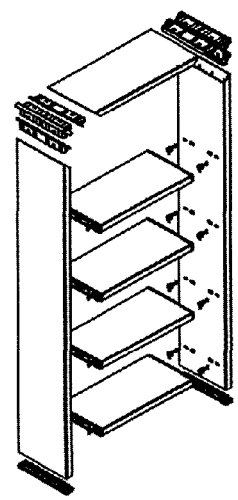

FIGS. 3 and 4 illustrate cross section view of a shelf system (1) with more particular detail. In particular, FIG. 4 illustrates the use of a triple component mating cork (6c1, 6c2, 6c3) that connects the beams (3) and cover shelf (4) to each other at both sides of the cover shelf (4). The cross section view of the triple cork (6c) is shown in the exploded view of the shelf system (1) in FIG. 3. Screws (8) appear in FIG. 3 on the same level of the shelves (2) between each shelf (2) and the vertical beams (3). These screws (8) are placed within the proximal wall of the beam (3) and couple to a recess in a connector (9) mated to the open side of the shelf (2). The connectors and recesses thereof are shown in particular detail in FIGS. 8A-13 and will be discussed later on in the description. The edges of the cover shelf (4) are cut in angle of 45° clockwise to complement the counterclockwise 45° angle of the proximal connector (6c3) of the triple cork (6c) connector. FIG. 4 shows a perspective view of the shelf system (1). One point to be noted is that the screws (8) seem to be coming out of the shelves (2) but are in fact oriented toward the shelves (2) from the holes (3a) into which they are plugged. This is better seen in FIG. 8G.

Figure 8A:
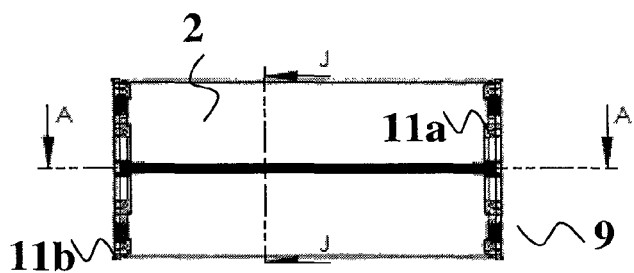
FIGS. 8A-10 illustrate a flat shelf and means of connecting it.
Figure 8B:
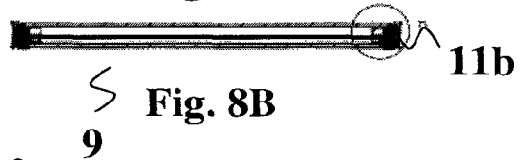
Figure 8C:
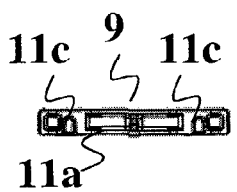
Figure 8D:
Figure 8E:
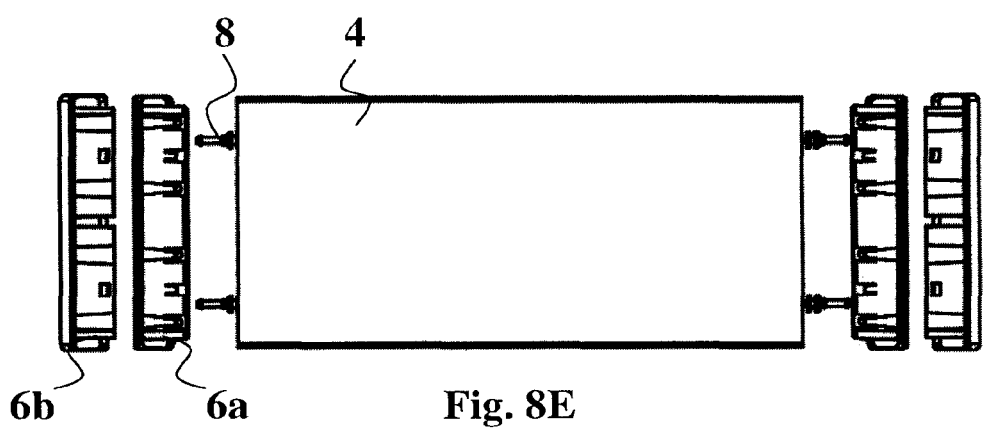
Figure 8F:
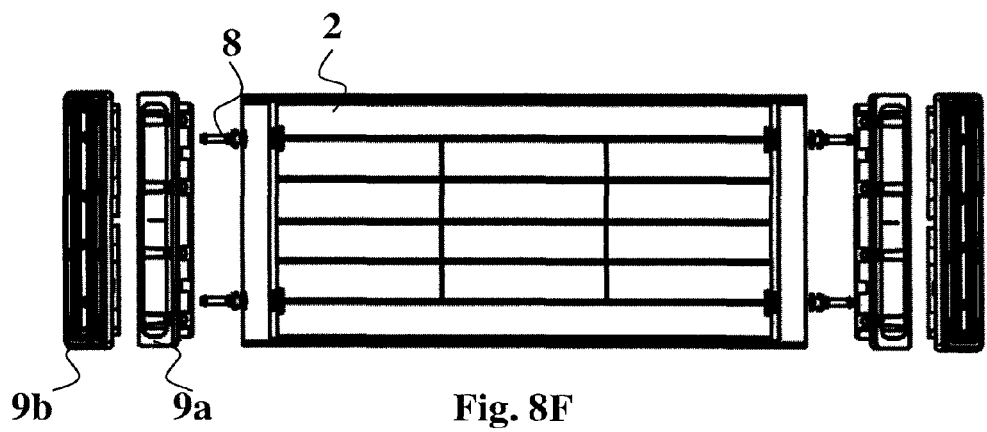
Figure 8G:
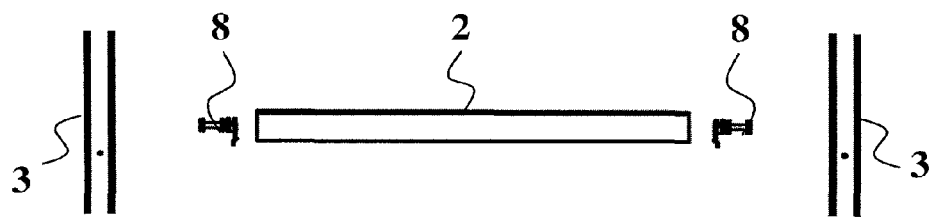
Figure 9:
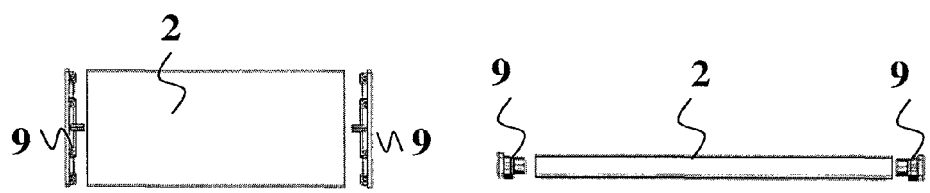
Figure 10:
Figure 11:
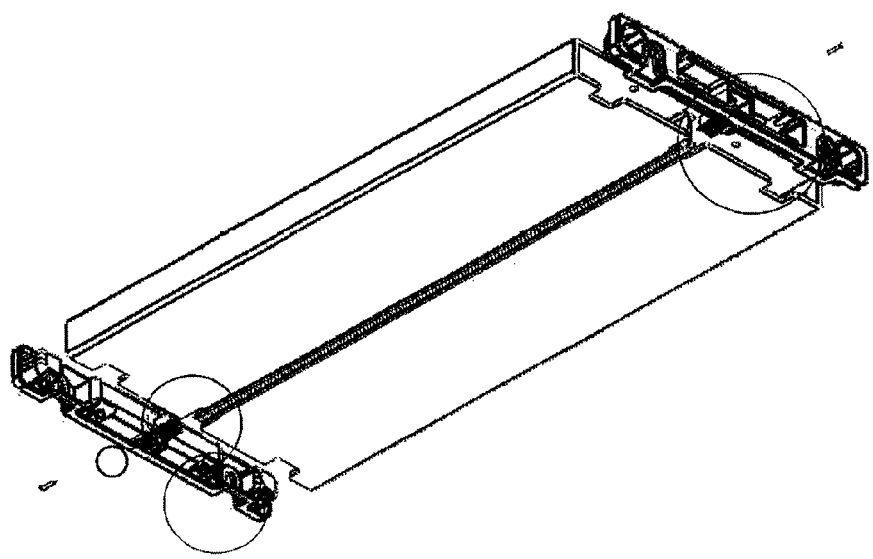
FIGS. 11-13 illustrate the flat shelf and connectors in three-dimensions.
Figure 12:
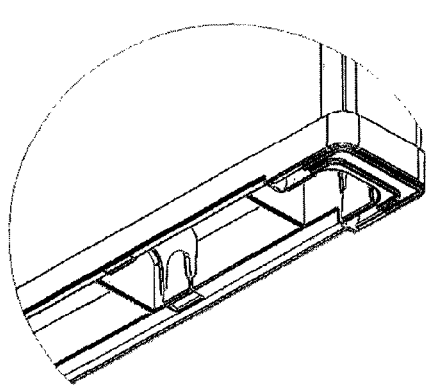
Figure 13:
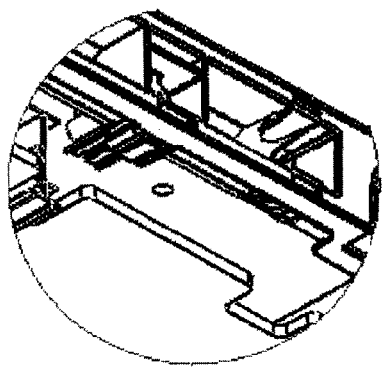

FIG. 8A shows in more detail the assembly of shelf (2) and shelf-connector (9), where the shelf-connector (9) fits into the open edges of the shelf (2). The shelf-connector (9) comprises middle (11a) and edge (11b) sections of the hollow space within the shelf-connector (9). FIG. 8B shows a zoom-in view of the edge section (11b) of the shelf-connector (9). Zoom-in view of the shelf-connector (9) also shows tab (11c) that is pressed against screw (8) and locks it in. This connection strongly holds the shelf (2) attached to the vertical beam (3) at both edges in horizontal position. The shelf (2) is easily detached from the vertical beams (3), since the screw (8) is not permanently connected to the shelf-connector (9). FIG. 8G is a zoom-in exploded view of the shelf (2), screw (8) and vertical beam (3) assembly. The screw head (particularly shown in FIGS. 26-29 and discussed in the description in relation to them) is oriented towards the shelf-connector (9) (not shown in this Figure) and provides a solid and stable support, which is sufficient to carry the load of the shelf (2) and weight loaded on it. FIGS. 8E and 8F are zoom-in top exploded views of the cover shelf (4) and shelf (2) and their respective shelf-connectors (6) and (9) of the shelf system (1). The connectors of both type of shelves are viewed from top front and rear views, marked as (6a) and (6b) for the cover shelf (4) and (9a) and (9b) for the shelf (2), respectively. The hollow space within the connector (6) for the cover shelf (4) comprises recesses into which two screws (8) are inserted once the connector is fixed within each one of the open edges of the cover shelf (4). The same configuration applies to the shelf (2) as seen in FIG. 8F. FIGS. 9 and 10 are top and front views of the shelf (2) and connectors (9) before coupling them together. FIG. 11 presents a bottom perspective view of the shelf (2) and connectors (9), showing the middle recess (11a) fitting to the patterned section at the middle of the bottom surface of the shelf (2) and in direct match to a groove (2b) at the end of the interface (12) formed between the open ends of the shelf (2) in its folded configuration. The recess (11a) of the connector (9) locks on to the two open ends of the shelf (2) and fastens them together at their interface (12). The patterned edges of the shelf (2) form rectangular grooves (2b) to which the sides of the recess (11a) are inserted. The recesses (11b) at the ends of the connector (9) lock on to the protruding pattern ends of the shelf (2) edges relative to the grooves (2b). FIG. 13 zooms in on the middle section of the connector (9) showing both the recess (11a) that protrudes into the interface (12) between the open ends of the shelf (2) and the patterned edge of the shelf (2), especially the groove (2b) into which the ends of the recess (11a) lock. FIG. 12 shows the tab (11c) in the connector (9) that presses against the head of screw (8) once introduced into it and keeps it steady in place.

Figure 46:
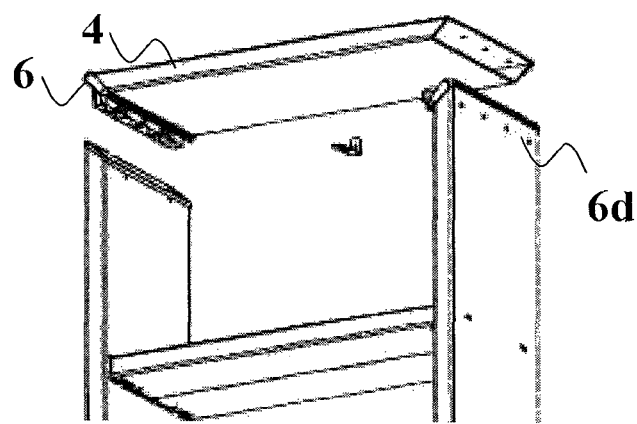
FIG. 46 illustrates exploded view of upper shelf and beams with disconnection holes.
Figure 47:
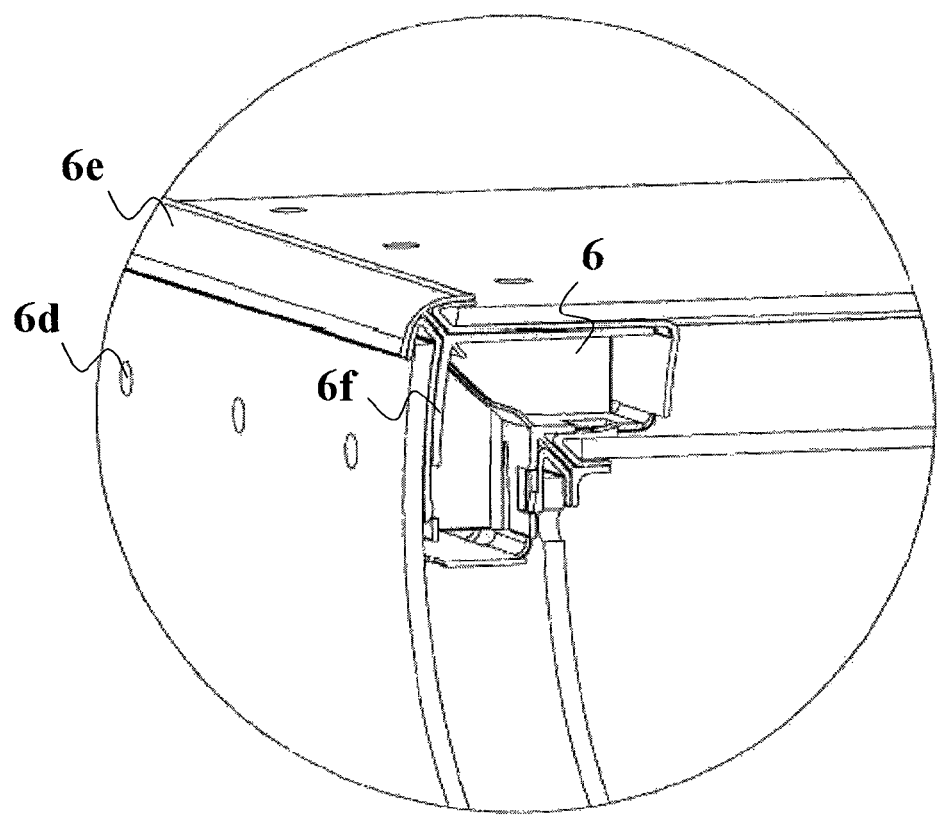
FIG. 47 is a zoom-in view of disconnection mechanism of upper shelf from beams.

The exploded view of upper shelf (4) and beams (3) in FIG. 46 illustrates also disconnection through holes (6d) adjacent the upper edge of the beam and enabling communication with cork (6). Holes (6d) enable easy and stable disconnection of cork (6) from the beams (3) by inserting a rigid rod that presses flexible plate (6f) extending from corner cover (6e), which is integral part of cork (6) and facing the holes (6d), zoomed-in in FIG. 47. Plate (6f) pushes against cork (6) when pressed and releases it from its locked position to the beams (3) and upper shelf (4).

Figure 19:
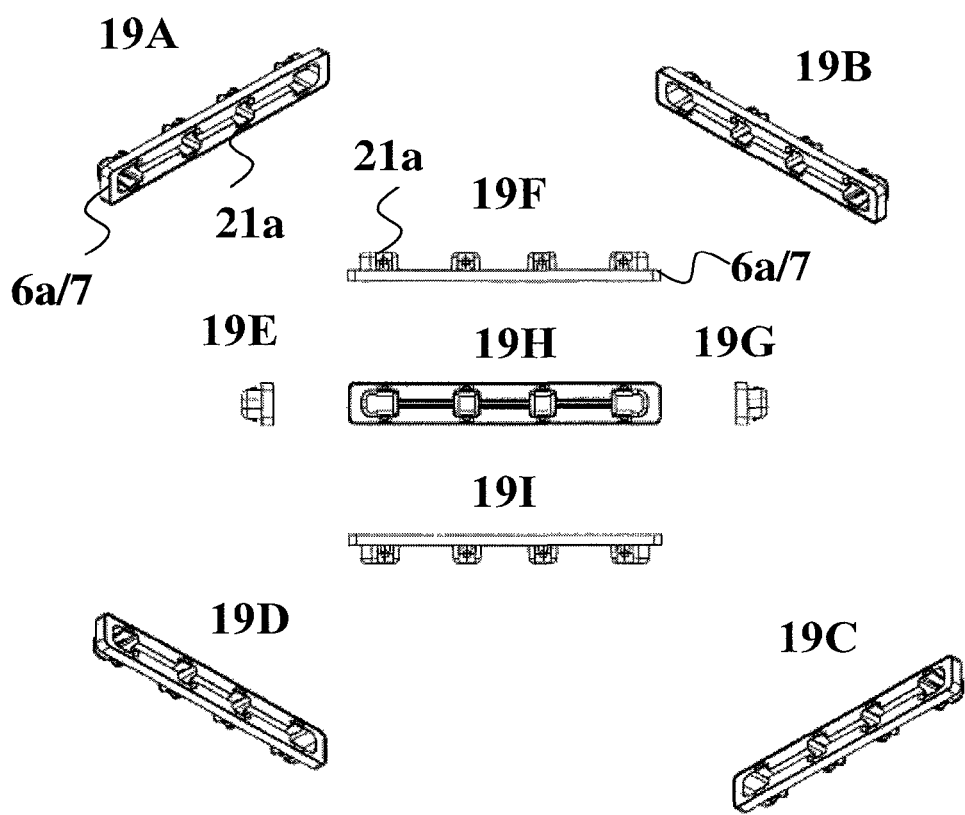
FIG. 19 illustrates different perspectives of a cork configured for mating with the open sides of a shelf or beam

FIGS. 19-22 show different views of the different corks and connectors used for mating to the open edges of the folded structures, e.g., shelf (2), vertical beam (3), cover shelf (4). FIG. 19 shows perspective front (A, B) and rear (C, D) views, up (F) and down (I) front views, top view (H) and left (E) and right (G) side views of a cork that is used to close and protect top (6a) and bottom (7) edges of a vertical beam (3), for example, The recesses (21a) of the cork fit and lock to a patterned shape of the of the open edge, providing it solid cover and protection from mechanical injuries and/or filtration of fluids.

Figure 20:
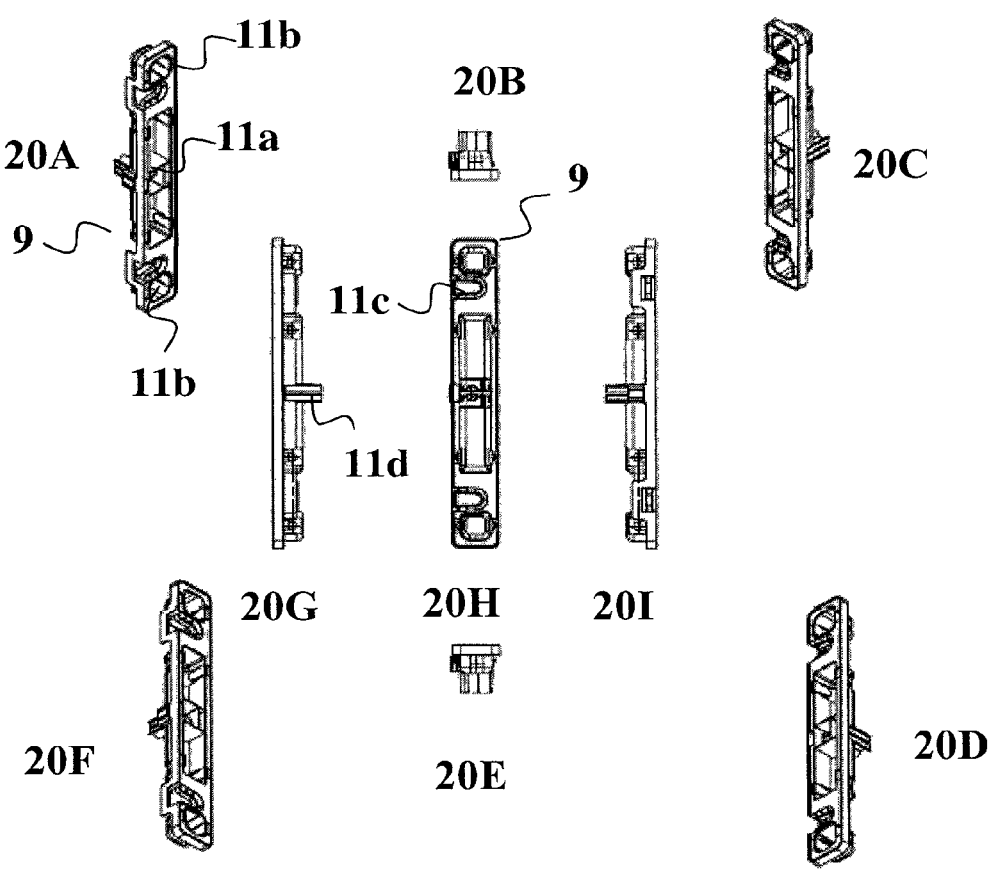
FIG. 20 illustrates different perspectives of a connector configured for mating with the open sides of a shelf.

FIG. 20 shows perspective front (A, C) and rear (D, F) views, left (G) and right (I) side views, top view (H) and up (B) and down (G) side views of a connector (9) for a shelf (2) in the shelf system (1). The different perspectives of the central recess (11a) and edge recesses (11b) of the connector (9) as shown in the different views provide the accurate locking to the open edges of shelf (2) and lock the shelf (2) open sides to each other with the profile (11d) extending from the central recess (11a).

Figure 21:
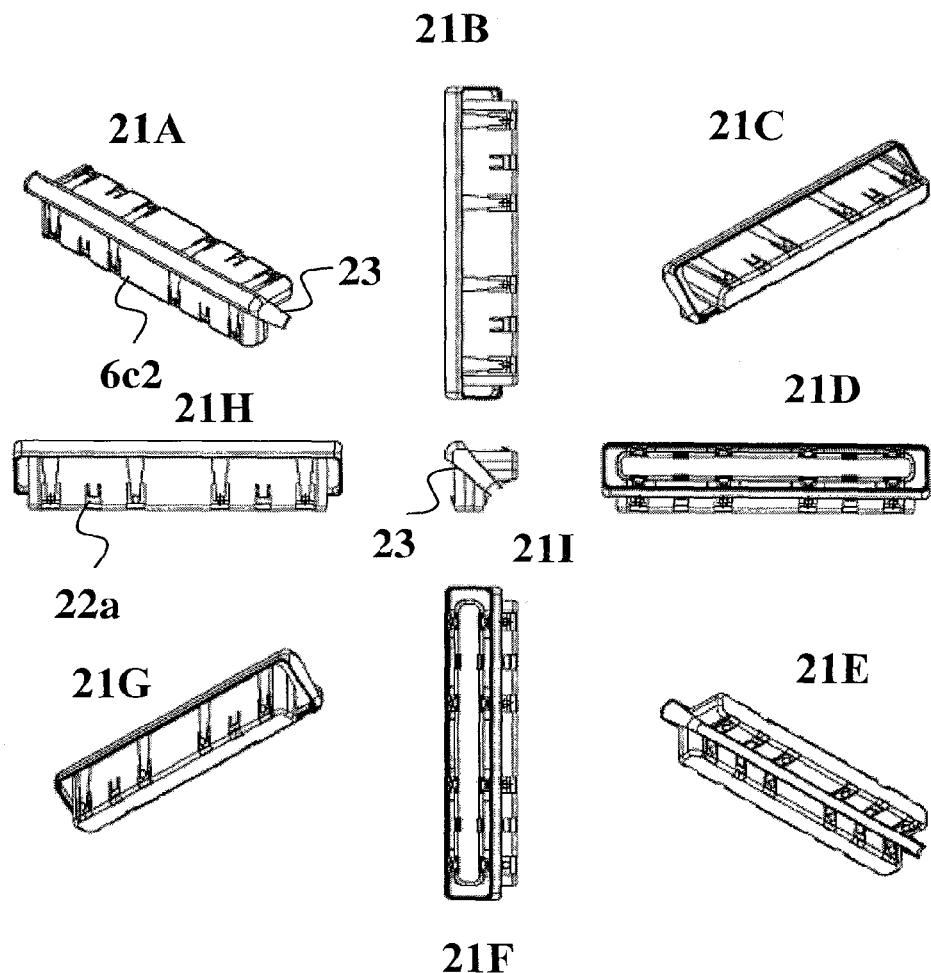
FIG. 21 illustrates different perspectives of a double-sided angled bridging piece between angled corks.

FIG. 21 shows the middle part connector (6c2) of a triple part cork used to connect the top open edge of a vertical beam (3) and open edge of a cover shelf (4) to each other. Perspective top (A), side (C, G) and bottom (E) views, front (B, H) and rear (D, F) views are shown. The position of the middle part connector (6c2) in the assembly of the triple part cork between the lower and upper parts is shown in (I). Both sides of the middle part connector (6c2) contain clips (22a) at their edges that mate with complementing tabs in the lower and upper parts of the cork. This provides a modular connection that can be disassembled and reassembled when constructing a shelf system in a Do It Yourself mode.

Figure 22:
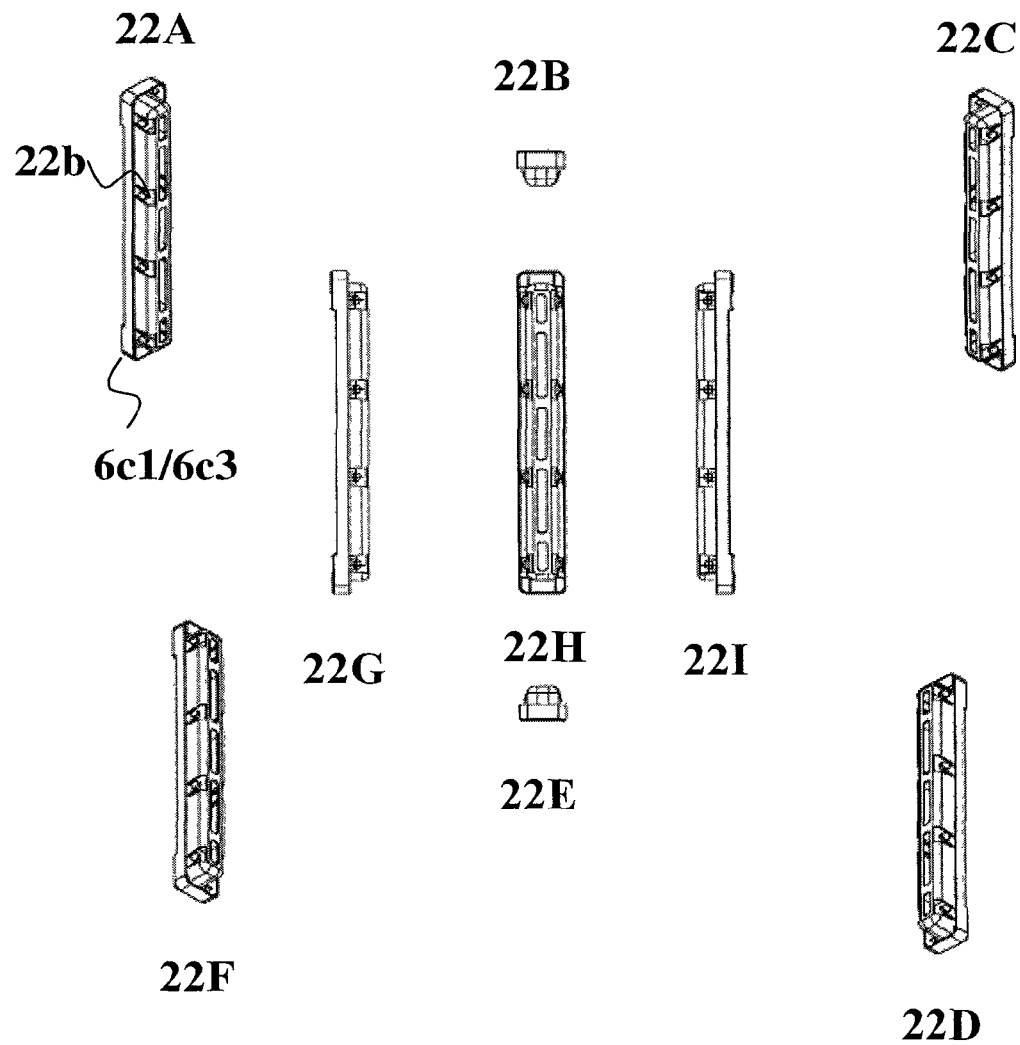
FIG. 22 illustrates different perspectives of a complementing cork mated with a cork mated with a shelf or beam.
Figure 22A:
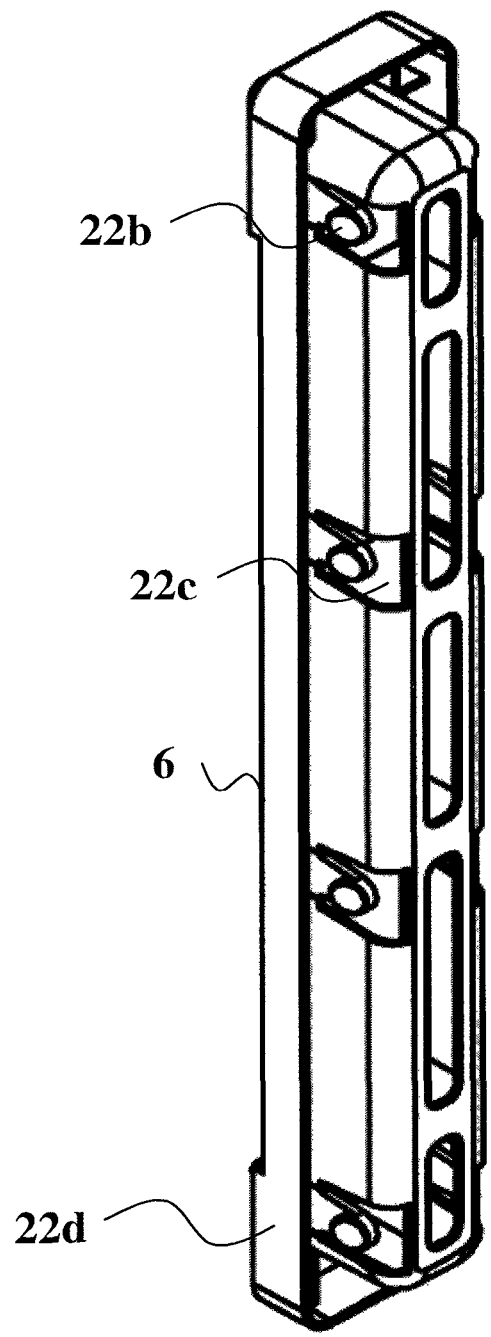

FIG. 22 shows perspective (A, C, D, F), side (G, I), front and rear (B, E) and top (H) of another configuration of a cork (6c1/6c3) that may be used to close open edges of folded shelves and beams in any shelf system of the present invention, e.g. shelf (2), vertical beam (3), cover shelf (4), floating or hanging (17) (shown in FIGS. 14-17) or in any other shelf system. Tabs (22b) press against the inner side of shelf or beam wall and lock in a non-through hole drilled into the inner side of the wall. A set of four tabs (22b) residing in windows (22c) that provide the tabs free space for movement while pressing are better viewed in FIG. 22A. The margins (22d) of the cork (6) are fit to cover the margins of the exterior surface of the shelf or beam, thereby protecting it from mechanical injuries or damages caused by fluids. The margins (22d) also provide aesthetic closure to the open edges of a shelf or beam.

Figure 43:
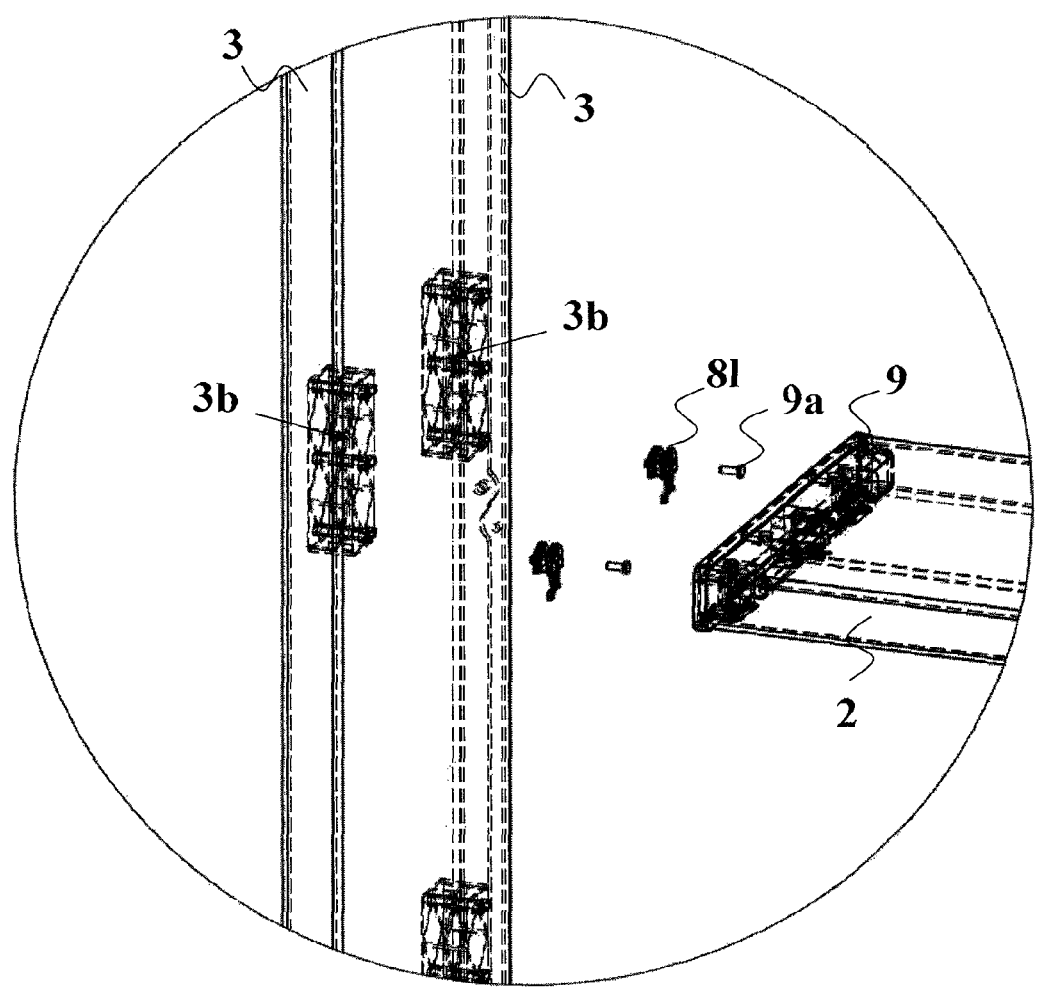
FIG. 43 illustrates exploded view of the connecting parts between shelf and beam.
Figure 44:
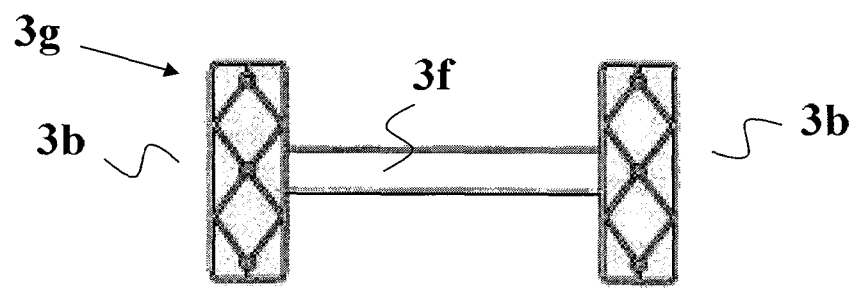
FIG. 44 is a cross-section view of a double shelf-connector.
Figure 45:
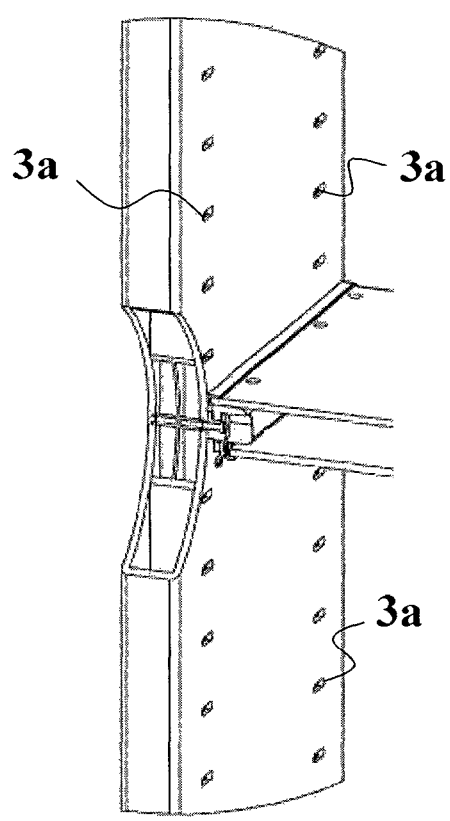
FIG. 45 illustrates side-section of a beam with a plurality of shelf connecting points.

The connection between the shelf (2) and beam (3) is done with cork and screw as illustrated and described in previous Figures and corresponding description. Particularly, such connection is done with a screw extending from one wall to the opposite wall of a hollow beam and locked on to or within these walls. This is best illustrated in FIGS. 28-29, discussed later in the description. Such screws provide improved strength to the beam itself, which may be further enhanced with a connector (3b) such as the one shown in cross-section, side-section and perspective views in FIGS. 41A-C. Such connector (3b) is plugged within the beam (3) and leveled with the shelf (2) in relative vertical position (see FIGS. 42, 43 and 45). The connector (3b) comprises an open frame box (3f) with dimensions fit for being tightly accommodated within the hollow space enclosed by the beam (3) and vertically relative to the shelf (2) (see FIG. 43). Diagonal ribs (3d) forming diamond shapes located within the space enclosed by the frame (3f) provide additional strength to the connector (3b) and are used to locate holes (3c) at their apices through which screws are inserted from one wall to the opposite wall of the beam (3). Particularly, the connection of a shelf (2) to a beam (3) enhanced with connector (3b) as shown in the exploded view of FIG. 43, is done with screws (9a) inserted through cork (9) that closes the sides of the shelf (2) and completing heads (8l). The screws then pass through the proximal wall of the beam (3) and through holes (3c) of the connector (3b). The screws (9a) are then locked within the distal wall of the beam (3). This configuration stabilizes the screws (9a) in place, also providing them shield and protection and further strengthens the beam (3) itself, providing it with supplemental rigidity. FIGS. 42 and 45 exemplify the possibility of relocating the shelf (2) vertically along the length of the beam (3). Use is made with the holes (3c) equally distanced one from the next along the connector (see FIGS. 41A-C) as do through-and-through holes (3a) in the proximal and distal (not shown) walls of the beam (3). The combination of shelf (2) and connector (3b) can then be moved up and down the beam (3) as a user desires. Finally, FIG. 44 features a variation of the connector (3b) in the form of a double-connector (3g) that comprises two connectors (3b) attached one to the other with horizontal connection beam (3f). Such double-connector (3g) provides stability to the connectors (3b) themselves, preventing their displacement from or inclination relative to their position. It also further enhances the rigidity of the beam (3).

Figure 5:
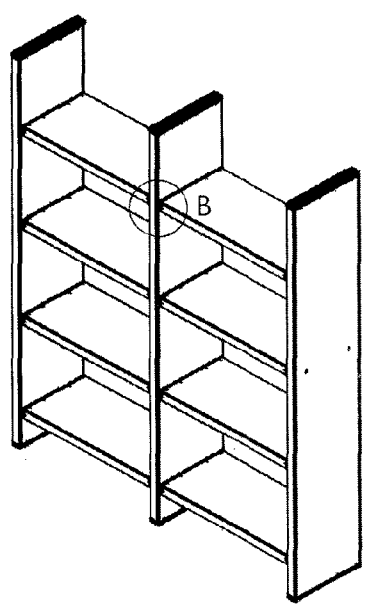
FIGS. 5-7 illustrate a general layout of a double shelf system.
Figure 6:
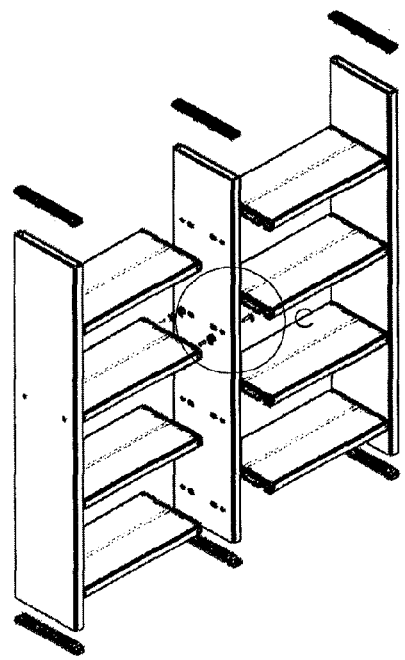
Figure 7:
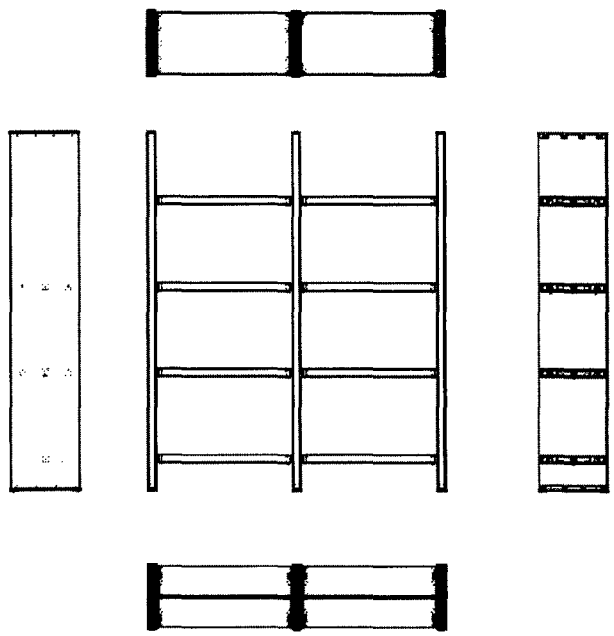

Returning now to other possible shelf assemblies, FIGS. 5-7 illustrate a double-shelf system (10) with three vertical beams (3) supporting two horizontal sets of shelves (2) without cover shelves above. Top and bottom corks, (6a) and (7) respectively, close the open top and bottom edges of the vertical beams (3), also providing protection from mechanical damage or fluid licking into the beam (3). FIGS. 5 and 6 show left and right perspective views of the double-shelf system (10) and FIG. 7 shows cross section of the system (10), front views of the vertical beams (3) and front (top of Figure) and rear (bottom of Figure) views of the shelves (2). FIGS. 6 and 7 also show that shelves (2) in the same level are actually interconnected with screw (8), passing through the middle vertical beam (3) and supporting two shelves (2). Such screw (8) has a double head, one head at each end, which enables it to couple with shelf-connectors (9) mated with the parallel edges of the shelves (2), proximal each other. The double-head configuration of screw (8) is shown in more particular detail in FIGS. 30-33.

Figure 26:
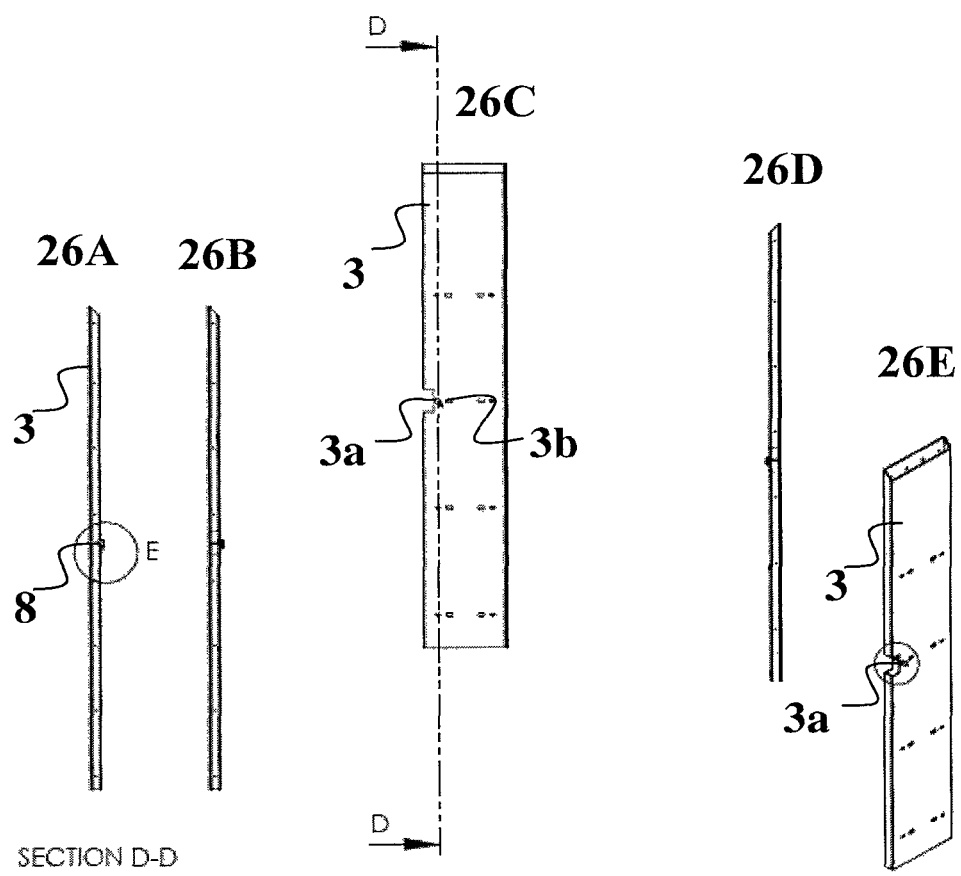
FIG. 26 illustrates profile views of a beam with ready-made insertions for connecting with shelves.

One of the key features of any shelf system provided according to the present invention is the screw (8) that mates with recesses within shelf-connector (9), for example, the shelf-connector (9) itself is mated with patterned open edges of the shelf (2). FIGS. 26-29 illustrate different aspects of the screw (8). FIG. 26 shows profile views (A, B, D) of the screw (8) inserted into the hollow space of a vertical beam (3) through the beam (3) wall. Front (C) view of the vertical beam (3) show a through-and-through hole (3a) through which the screw (8) is inserted, and a non-through groove (3b) to which an extended tab of the screw is locked. Expanded view of the groove (3b) and tab is provided in FIGS. 27 and 29 and discusses further in the description in relation to them. Perspective (E) view of the vertical beam (3) in FIG. 26 shows a cut-through view of the interior of the beam (3) at the location of the screw (8). The screw (8) actually passes through hole (3a) and extends horizontally relative to the length of the beam (3) into the parallel wall of the beam (3). This is also discussed further in the description in relation to FIGS. 28-29.

A single top head screw (8) is shown in particular detail in FIG. 27 in top (A, B) and bottom (C, I) perspective views, side view (F), front (H) and rear (D) views and top (E) and bottom (G) views. The screw (8) may be divided into proximal head, body and distal tip sections.

The head section comprises horizontal top flat surface (8b), horizontal bottom flat surface (8a), vertical spacer (8i) between the two horizontal flat surfaces, top (8b) and bottom (8a) and tab (8c) extending from the horizontal top flat surface (8b). This configuration enables the head to couple within appropriate recess in a shelf-connector (9). The vertical spacer (8i) between the two top and bottom horizontal surfaces, (8b) and (8a) is of sufficient thickness and length to support the shelf, when inserted into the recess inside the shelf-connector (9). The top horizontal surface (8b) locks in the interior of the shelf-connector (9), while the bottom horizontal surface presses against the vertical beam (3), see for example FIGS. 28 (A) and 29 (B), (D) and (E). After inserted into the beam (3), the screw (8) may be turned within the through-and-through hole (3a). Tab (8c) is shaped with a step in order to anchor the screw (8) to the beam (3) by turning the screw (8) sideways and locking the lower part of the step inside a non-through groove (3b) in the beam (3). The groove (3b) may be located at any point near the hole (3a) a distance that equals the length of the upper part of the step of the tab (8c). The tab (8c) comprises a tooth (8s) extending vertically away from it, where the tooth (8s) is configured to press against an inner tab within a recess within a connector mated to an edge of a shelf and lock inside the recess.

The body section of the screw (8) comprises an upper section (8j) with flaps (8e) extending out in opposite directions relative to each other. The hole (3a) is of shape, length and width suitable to allow the upper section (8j) and flaps (8e) through when the flaps (8e) are in parallel position to the hole (3a). When the screw (8) is turned 90° or at any angle relative to the plane of the hole (3a) within the hole (3a), the flaps (8e) turn as well and press against the inner surface of the proximal wall of the beam (3). This can be viewed in FIGS. 28 (C) and 29 (A) and (C). The flaps (8e) lock the screw (8) to the beam (3), thereby providing additional stability and strength to the construction of the shelf system. The thickness of the upper section (8j) is equal to the thickness of the proximal wall of the beam (3), thus residing in it firmly. The middle elongated section (8f) of the screw (8) continues the upper section (8j) and has a smaller diameter and a length equal to the distance in the hollow space (3c) between the inner surfaces of the proximal and distal walls of the beam (3). This is shown in FIGS. 29 (A)

and (D), for example. The lower section (8k) of the screw (8) has two flap pairs (8d) and (8g) one above each other. The lower pair of flaps (8g) is inserted into a non-through hole (3d) within the distal wall of the beam (3), the hole (3d) is shaped and sized to allow the flaps (8g) inside the distal wall, see for example FIG. 29 (F). The hole (3d) within the distal wall of the beam (3) is of sufficient depth and space to enable turning the flaps (8g) within it at any angle relative to the plane of the hole (3d) entrance. When the screw (8) is turned the pair of flaps (8g) is turned within the space of the hole (3d) and the pair of flaps (8d) above them turns in concert as well. Flaps (8g) and (8d) press against the inner surface of the distal wall of the beam (3) from both sides, thereby anchoring the screw (8) to the beam (3) and providing substantial strength and stability to the attaching of a horizontally positioned shelf (2) to a vertical beam (3). This is best viewed in FIGS. 28 (A)-(C) and 29 (B) and (D). The construction of the shelf system gains as a result a stable structure configured to carry heavy weight loads.

Still, use of other types of screws for attaching the shelves (2) to the beams (3) is contemplated within the scope of the present invention. Accordingly, screws such as mushroom screw, regular screw, snap screw, nit and other types may be used. Further, such screws may be releasable or permanently fixed in place after being inserted into the cork (9) and holes (8a) in the beams (3).

Figure 32:
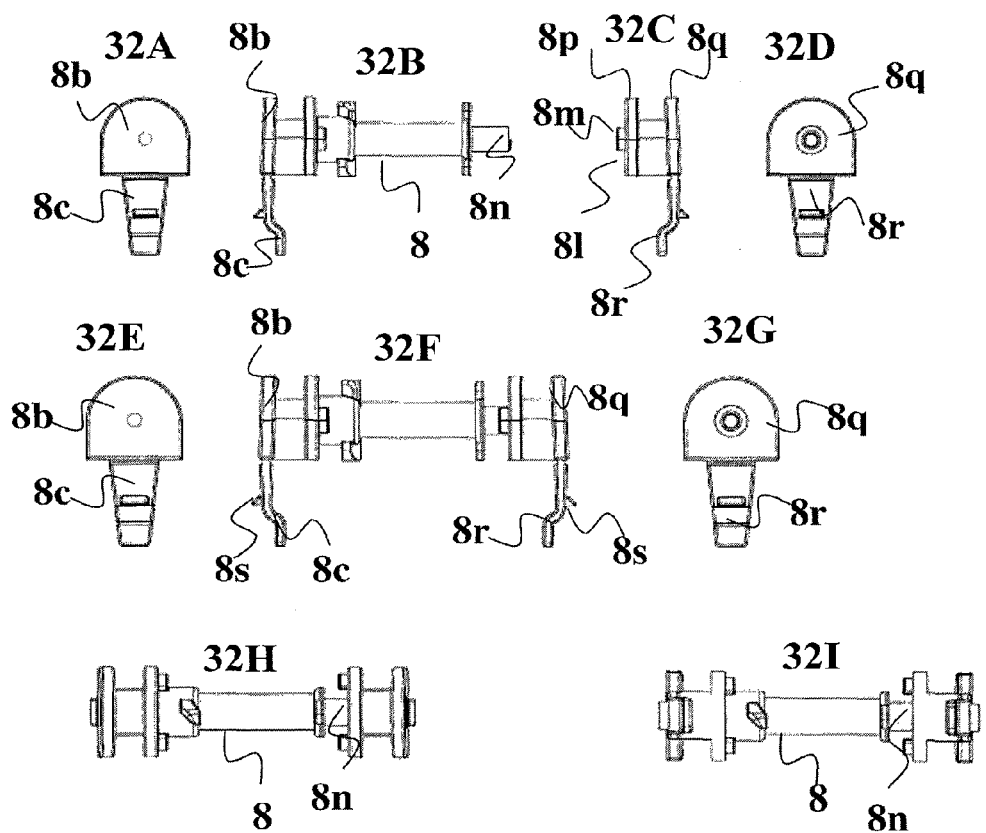
FIG. 32 illustrates cross section and top views of a double-sided shelf supporting screw.
Figure 33:
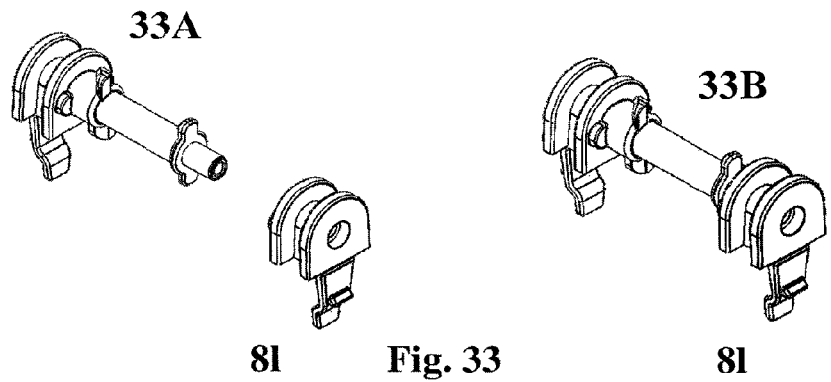
FIG. 33 illustrates 3D perspective views of double-sided shelf supporting screw.

The double shelf assembly system (10) illustrated in FIGS. 5-7 requires that the screw (8) connecting two shelves (2) to a vertical beam (3) between them be provided with a double head (8l). This configuration of the double-head screw is illustrated in FIGS. 30-33. Particularly, front and rear views of disassembled presentation of the double-head screw are shown in FIG. 31. The body of the screw (8) is shown in FIG. 31 in (A) and (D) and the completing head (8l) in (B) and (C). FIG. 32 illustrates in more detail the different parts of the double-head screw. Particularly, the body of the lower section (8n) of the screw (8) forms an elongation of the middle section (8f) of the screw (8) after removing the lower flaps (8g). The lower section (8n) is now defined by the upper flaps (8d) and its body (8n), the body (8n) itself has a cylindrical shape with outer diameter that couples with a hollow cylindrical space within the completing head (8l). This coupling enables to attached two shelves (2) to a vertical beam (3) between them, where the both heads are coupled with recesses in the connectors mated with the open edges of the shelves. The different views of the double-head screw are shown in FIG. 32 in both assembled and disassembled configurations. Particularly, FIG. 32 (B) shows the disassembled configuration, where the body of the cylindrical lower section (8n) faces the hollow space (8m) of the completing head (8l). The assembled configuration of the screw (8) and completing head (8l), especially the coupling of the lower section (8n) and the cylindrical recess (8m), is shown in FIG. 32 (F). FIGS. 32 (H) and (I) show the assembled configuration in front and rear views. FIGS. 32 (A), (D), (E) and (G) are top views of the double-head screw when observed from the screw head and the completing head perspectives. FIGS. 32 (B) and (F) illustrate also the tooth (8s) that extends vertically away from the tab (8c) in both heads. Similarly to the single-head screw, the tooth (8s) is configured to press against an inner tab within a recess within a connector mated to an edge of a shelf and lock inside the recess. FIG. 33 illustrates perspective views of the double-head screw in disassembled and assembled configurations, (A) and (B), respectively.

FIG. 30 (A)-(C) illustrates the actual positioning of the double-head screw in constructing a shelf-system. The screw (8) is first inserted through the through-and-through hole (3a) in the vertical beam (3). It is then coupled with the completing head (8l) on the other side of the vertical beam (3) at the outer surface of the distal wall (when viewed from the screw (8) position). Both heads of the double-head screw are oriented parallel each other, allowing the coupling with the shelf-connectors (9) recesses (11b) from both sides of the vertical beam (3). FIG. 30 (B) shows the completed construction of the double-shelf system, where the screw (8) and heads thereof are covered by the shelf-connectors (9). This form of hidden screw-recess couplings creates a smooth and continuous flow between the shelves (2) and beams (3) in the shelf system. Such continuous flow provides the advantage of a continuous graphic or print throughout the entire viewable surfaces of the shelf system. This in turn enables designing graphic concepts, e.g. logos, pictures and images, which take all the viewable surfaces of the shelf-system as a whole. Accordingly, a single image may be pre-designed and printed on the entire viewable surfaces of any shelf system or constructions built from the folded shelves and beams of the present invention.

Figure 17:
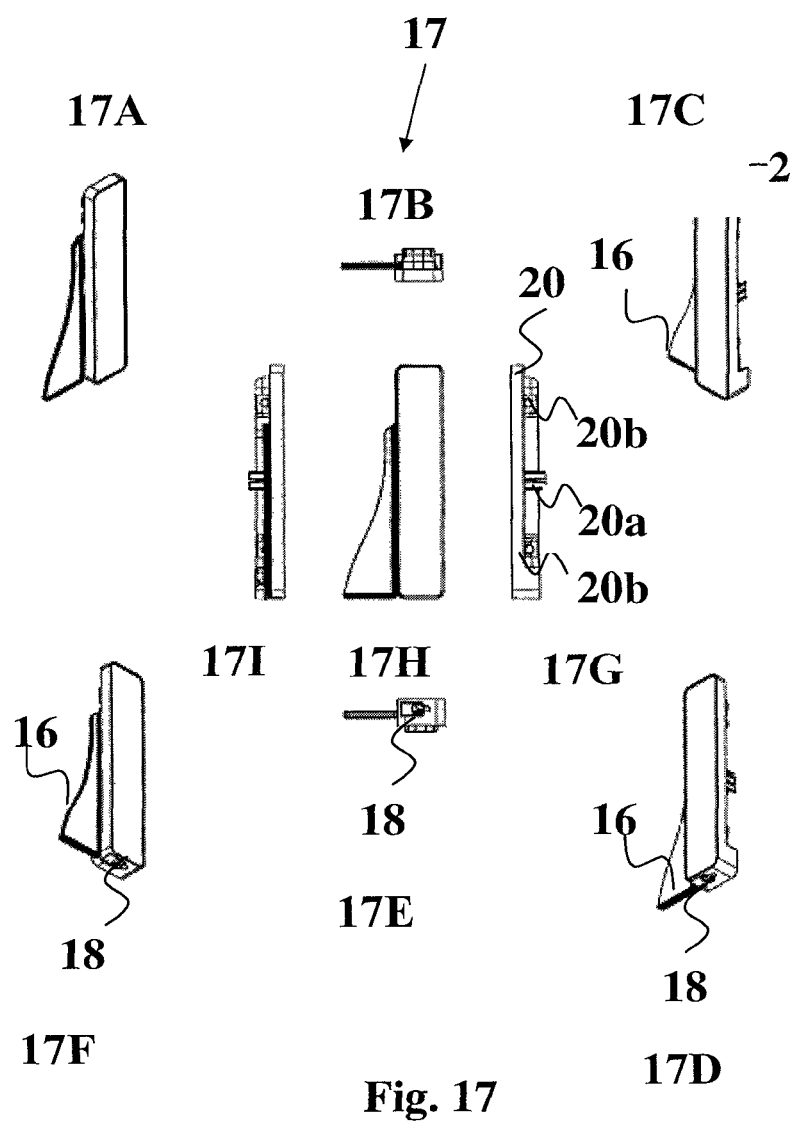

FIGS. 14-17 illustrate other examples of floating shelf (17) and hanging shelf (17a) constructions based on the folded shelf (2). The shelf (2) is a folded sheet placed with its open sides facing down. For the floating shelf (17) in FIG. 14, shelf-connectors (20) mate with the open edges of shelf (2), the edges are patterned to lock with the shelf-connectors (20). Screws (15) are inserted into matching holes (15a) in the shelf-connectors (20) and going through overlapping holes in the supports (16) that glide into an upper rail within the shelf-connectors (20). This way the screws (15) fix the supports (16) to the shelf-connectors (20). Covers (14) close the exposed insides of the shelf-connectors (20) providing them both protection and aesthetic look. For the hanging shelf (17a), illustrated in FIGS. 15 and 16, the structure is the same as the floating shelf (17), except that hangers (16a) are glided into a lower rail in the shelf-connectors (20). The hangers (16a) are fixed in place to the shelf-connectors (20) with screws, and the exposed inside of the shelf-connectors (20) is covered with cover (14) for protection and aesthetic purposes. FIG. 17 shows perspective (A, C, D, F), top (I), bottom (G), front (H), and side (B, E) views of the floating shelf (17). Particularly, the middle and side recesses, (20a) and (20b) respectively, of the shelf-connector (20) are shown, which are used to lock to a patterned open edge of the shelf (2) and host the screws (15) that fix the supports (16) to the shelf-connectors (20). Rail (18) is shown the in the perspective views (F) and (D), with the support (16) slid in it.

Figure 18:
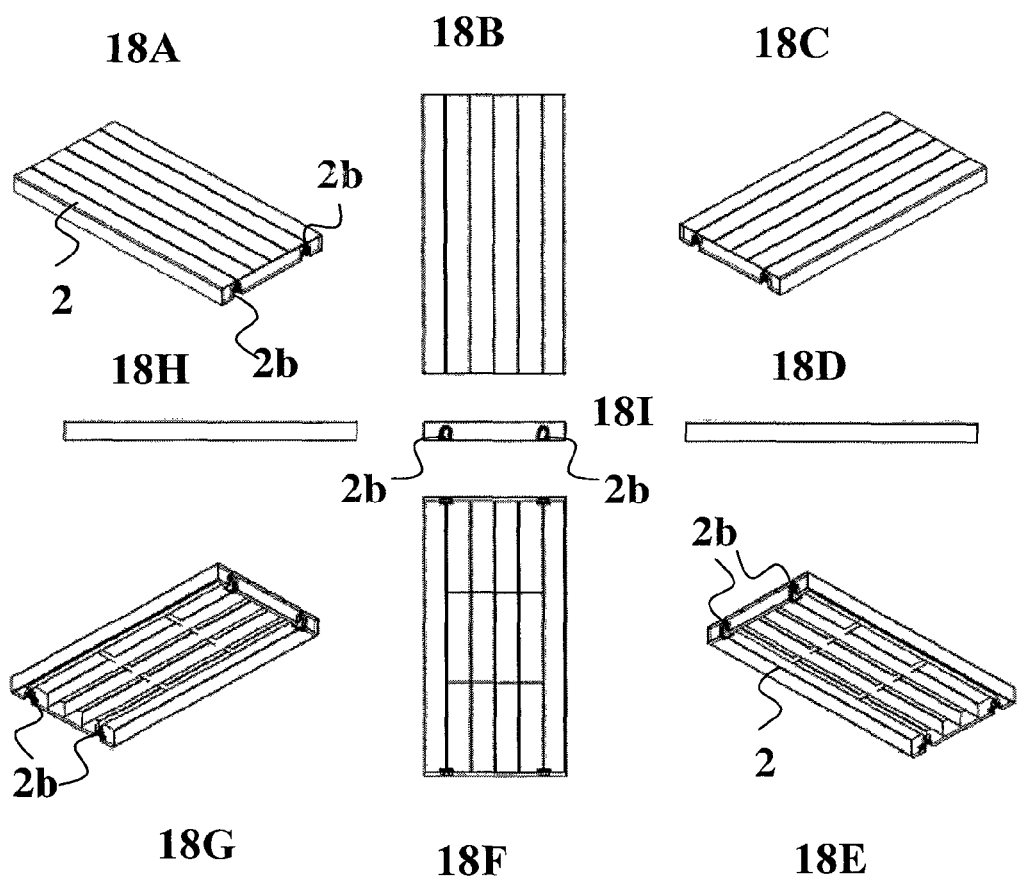
FIG. 18 illustrates a standard shelf at different perspective views.

FIG. 18 shows a general configuration of a folded shelf (2) of the present invention with perspective (A, C, E, G), top (B), bottom (F) and side (H, D, I) views. Recesses (2b) are used to accommodate screws in proximity to the ends of both open edges of the folded shelf (2).

Additional reinforcement of the shelf (2) and shelf construction in general is H-shaped aluminum profile used to interconnect open ends of a folded shelf (2) or neighbor structural parts of the shelf construction. Examples of interconnecting aluminum profiles (24) and (25) are shown in FIGS. 23 and 24, respectively. The bounding bars, (24a), (24b) and (24d) of profile (24), (25a) and (25b) of profile (25), close on the outer and inner surfaces of a folded shelf or neighbor construction parts, providing them external skeletal support. The middle rails, (24c) and (25c), provide additional support by accommodating edges of such parts. Particular use of such aluminum profile (26) is shown in FIG. 25, where external bounding bar (26c) closes and covers the gap between two neighbor parts of a construction and edge bars (26a) and (26b) lock within the construction parts on the opposite side.

Figure 34:
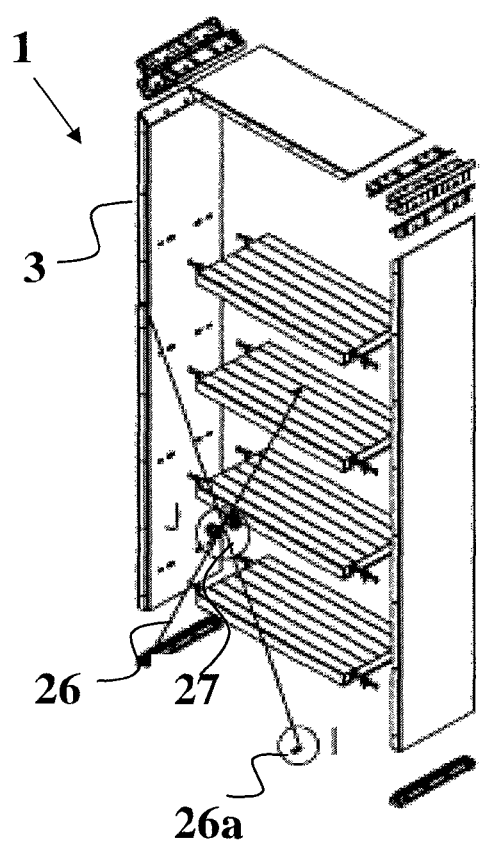
FIG. 34 illustrates back support strings for a shelf system in crossing configuration.
Figure 35:
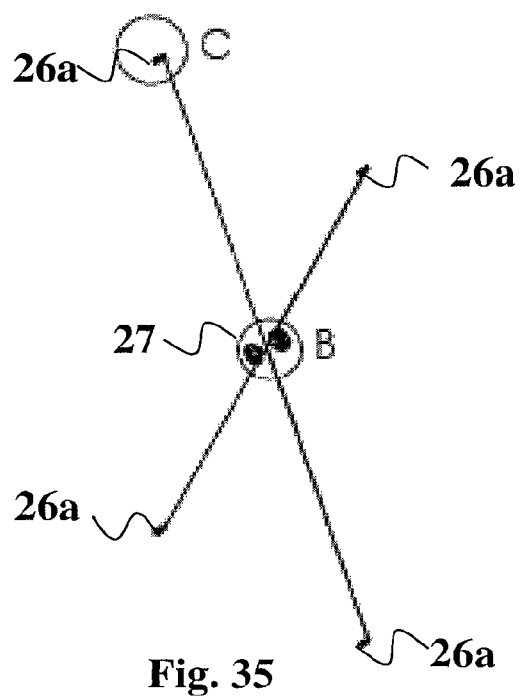
FIG. 35 illustrates the crossing configuration of the back support strings.
Figure 36:
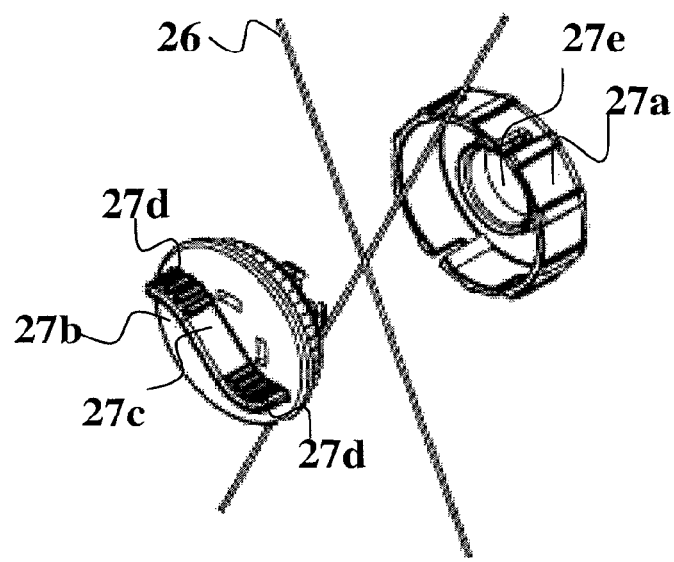
FIG. 36 illustrates a disc for straining the back support strings in a closer view.
Figure 37:
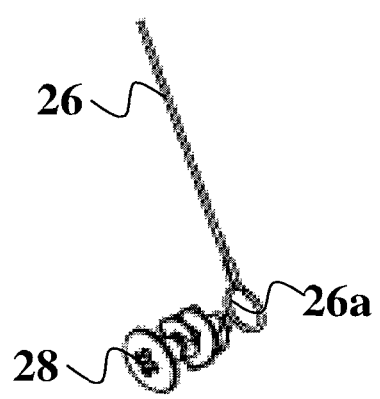
FIG. 37 illustrates the coupling of screw and ring at the ends of each back support string for connecting them to a shelf system in zoom-in view.
Figure 38:
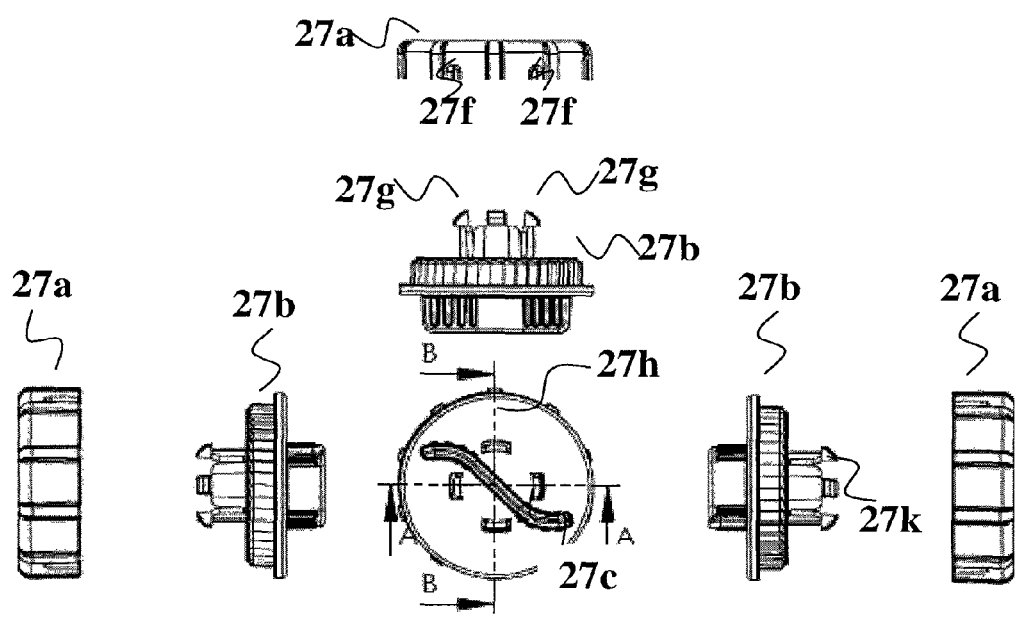
FIG. 38 illustrates the different parts of the disc for straining the back support strings.

Another additional back reinforcement option of a construction of the present invention is illustrated in FIGS. 34-39. Two other options are a board connected to the back ends of the vertical beams of a shelf system or any other construction of the present invention. Such option is shown in FIG. 1, where board (5) seals the open back side of shelf system (1) and provides additional support that holds the entire construction stable in vertical position. Another option is a cross configuration of two rigid aluminum profiles connected to the top and bottom ends of the vertical beams in their back. A third option is illustrated in FIG. 34, where two flexible strings (26) are connected in cross configuration to the top and bottom ends of the vertical beams (3) at their back. The shelf system (1) is shown in exploded or disassembled view, where the cross configuration of the strings (26) is distanced a little away from the beams (3). A string stretching modular box (27) is connected to the strings (26) at their intersection point. The box (27) is configured to tune the strings (26) from a relatively relaxed to a stretched state, intended to maximize the support of that the crossing strings (26) provide to the shelf system (1). Ring (26a) and screw (28) pairings, zoomed in FIG. 37, are used to fix the strings (26) to the top and bottom ends of the vertical beams (3). As shown in FIG. 37 the spiral configuration of screw (28) fits into the ring (26a) fastening it to the beam (3) ends. The strings may be stretched after fixing them with the screw (28) and ring (26a) couplings by radially turning the box (27) that holds the strings (26) in their crossing point.

FIG. 35 illustrates crossing strings (26) backing for a shelf system. FIG. 36 zooms in the box (27) shown in FIG. 35. The box (27) comprises a recipient case (27a) and a cork (27b) matching the case (27a). The base of the case is hollow (27e), allowing snap fit tabs (27g) (shown in FIG. 38) to press against the edge of the hollow base (27e), pushed out and lock on it outer side. This way the cork (27b) remains locked to the case (27a), which frees it to turn radially and stretch the strings (26). The stretching mechanism of the box (27) comprises a wave-shaped handle (27c) extending vertically on top of the cork (27b). The ends (27d) of the handle (27c) have a rough texture, comprising bulged lines. The handle (27c) is surrounded with four bumps (27h) (seen in FIG. 38) that engage with the bulged lines in the handle (27c) as the handle (27c) is turned on its axis. When the box (27) is closed on the intersection of the strings (26), the handle (27c) is turned on its axis and the bumps (27h) that lock between the bulged lines on the handle (27c). Hollow grooved extension (27k) of the cork (27b) (best seen in FIGS. 38 and 39 (A)) mates with the strings (26) at their intersection and provides tight space to hold them. Accordingly, the strings (26) respond to the turning of the cork (27b) within the case (27a) by radially turning around their longitudinal axis. This way, a stretching effect of the strings (26) is obtained. The strings (26) are stretched accordingly and retain their stretched position due to the locking of the bumps (27h) between the bulged bumps (27c). The strings (26) may further be stretched upon turning of the handle and locking as described above. Open ended grooves (27f) at the edge of the case (27a) press the textured base of the cork (27b), thereby providing sufficient friction against each other and further stability to the box (27) as its cork (27b) is turned.

Those skilled in the art to which this invention pertains will readily appreciate that numerous changes, variations and modifications can be made without departing from the scope of the invention mutatis mutandis.

The invention claimed is:

1. A modular reversibly assembled construction configured for carrying high weight loads and accommodating and storing articles, said construction comprising a plurality of structural parts each one of said structural parts is made of a polymeric, three-layer flat sheet and formed by folding said three-layer flat sheet around itself, said three-layer flat sheet enclosing hollow space when folded around itself, said polymeric, three-layer sheets comprising first flat printable layer, second flat bendable layer opposite said first flat printable layer and intermediate layer between said first and second flat layers, said intermediate layer comprising supporting structure between said first flat printable layer and second flat bendable layer, said supporting structure comprising spacers oriented in space comprising a top end interfacing said first printable first layer and bottom end interfacing said second flat bendable layer, said structural parts comprising at least one horizontal shelf and at least two vertical supports, wherein said at least one horizontal shelf is reversibly attached on first open side to one of said at least two vertical supports and on a second open side to second of said at least two vertical supports opposite said first open side with screw-connector couplings, a connector of said screw-connector couplings is configured to mate with said open sides of said at least one horizontal shelf, a screw of said screw-connector couplings is configured to lock within said connector and extend through hollow space enclosed within each of said at least two vertical supports and lock within parallel walls of said hollow space of each of said at least two vertical supports, said modular reversibly assembled construction is configured to carry high weight loads.

2. The construction of claim 1 further comprising a top cover configured to mate with connector-connector couplings, said connector-connector coupling is configured to mate with open edges of said top cover and open top edges of an adjacent structural part of said at least two vertical beams.

3. The construction of claim 2, wherein said connector-connector couplings are triple-part couplings comprising two side parts configured to mate with open sides of said top cover or said adjacent structural part of said at least two vertical beams and middle part configured to mate with said side parts, said side parts, middle part, sides of top cover and sides of an adjacent structural part of said at least two vertical beams are inclined 45°, wherein a direction of each inclination thereof is configured to mate with opposite direction of inclination of said adjacent structural part.

4. The construction of claim 1, further comprising corks configured to close open sides of said at least two vertical beams.

5. The construction of claim 1, further comprising covers overlaid on open sides of said at least two vertical beams and screws configured to attach said covers to said open sides.

6. The construction of claim 1, wherein said connector comprises middle and edge recesses configured to mate with patterned margins of open edges of said structural parts, said edge recesses comprising a tab configured to press against and lock said screw within said edge recesses.

7. The construction of claim 1, wherein said construction is selected from, shelf system, closet, cabinet, vanity, cupboard and dresser.

8. The construction of claim 1, wherein said construction is said one horizontal shelf, said horizontal shelf is a floating shelf made from said polymeric, three-layer flat sheet folded upon itself, two corks configured each to mate with an open side of said horizontal shelf, two supports configured to slide into rail grooves in said corks, screws configured to lock said supports to said corks and outer covers configured to close exposed sides of said corks.

9. The construction of claim 1, wherein said construction is said one horizontal shelf, said horizontal shelf is a hanging shelf made from said polymeric, three-layer flat sheet folded upon itself, two corks configured each to mate with an open side of said horizontal shelf, two hangers configured to slide into rail grooves in said corks, screws configured to lock said supports to said corks and outer covers configured to close exposed sides of said corks.

10. The construction of claim 1, further comprising a back support attached to distal sides of said vertical supports.

11. The construction of claim 10, wherein said back support is a solid board, X-shape positioned aluminum rails or X-shape positioned strings, said aluminum rails and strings are configured to connect with top and bottom ends of said vertical support.

12. The construction of claim 11, wherein said X-shape strings further comprising a box mating with intersection of said strings, said box comprising case and cork, said cork is configured to mate with said case and lock within, said box is configured to turn around its axis and stretch said strings to a desirable tension.

13. The construction of claim 10, further comprising at least one connecting means configured to connect said construction to a wall, said connecting means is in the form of a right angle member having two ribs, said right angle member is connected to outer surface of said vertical supports at one rib and to said wall at a second rib.

14. The construction of claim 1, further comprising reinforcing H-shape aluminum rail configured to close on adjacent edges of said at least one horizontal shelf or each of said at least two vertical supports and lock to connectors mating on sides of said at least one horizontal shelf or each of said at least two vertical supports, said adjacent edges are not attached to each other.

15. The construction of claim 14, wherein said H-shape aluminum rail comprises outer flat surfaces configured to press against sides of a surface of said at least one horizontal shelf or each of said at least two vertical supports and a channel positioned between said flat surfaces and configured to accommodate edges of said at least one horizontal shelf or each of said at least two vertical supports.

16. The construction of claim 14, wherein said H-shape aluminum rail comprises outer flat surfaces configured to press against adjacent vertical supports and edges extending from ends of one of said outer flat surfaces and configured to mate with non-through channels within walls of said adjacent vertical supports.

17. The construction of claim 16, wherein said first flat printable layer is an outer layer of said at least one horizontal shelf or each of said at least two vertical supports and said second bendable layer is an inner layer of said at least one horizontal shelf or each of said at least two vertical supports.

18. The construction of claim 17, wherein said first flat printable layer is textured to enable a layer of paint to adhere to it.

19. The construction of claim 16, wherein said flat sheet is polypropylene bubble sheet comprising textured printable layer and bendable layer opposite said textured printable layer, both said layers are rigid, wherein said spacers are polypropylene bubbles oriented towards said textured printable layer, wherein top end of said bubbles comprises a thinner layer of polypropylene relative to lower end of said bubbles.

20. The construction of claim 18, wherein said supporting structure is in the form of honeycomb structure, fluted or corrugated extruded formation or said polymeric, three-layer flat sheet is in the form of a multiwall structure.

* * * * *